(12) United States Patent
Chowdhury

(10) Patent No.: US 8,976,061 B2
(45) Date of Patent: Mar. 10, 2015

(54) RADAR SYSTEM AND METHOD OF MANUFACTURING SAME
(76) Inventor: Sazzadur Chowdhury, Windsor (CA)
( * ) Notice: Subject to any disclaimer, the term of this patent is extended or adjusted under 35 U.S.C. 154(b) by 262 days.
(21) Appl. No.: 13/261,407
(22) PCT Filed: Mar. 3, 2011
(86) PCT No.: PCT/CA2011/000232
§ 371 (c)(1), (2), (4) Date: Sep. 26, 2012
(87) PCT Pub. No.: WO2011/106881
PCT Pub. Date: Sep. 9, 2011

(65) Prior Publication Data
US 2013/0027240 A1 Jan. 31, 2013

Related U.S. Application Data
(60) Provisional application No. 61/282,595, filed on Mar. 5, 2010.

(51) Int. Cl.
*G01S 7/03* (2006.01)
(Continued)

(52) U.S. Cl.
CPC .............. *H01Q 21/065* (2013.01); *G01S 7/032* (2013.01); *G01S 13/345* (2013.01); *G01S 13/422* (2013.01);
(Continued)

(58) Field of Classification Search
CPC ............ G01S 7/02; G01S 7/03; G01S 7/032; G01S 7/35; G01S 7/352; G01S 13/02; G01S 13/04; G01S 13/06; G01S 13/08; G01S 13/32; G01S 25/008; G01S 13/42; G01S 13/422; G01S 13/50; G01S 13/58; G01S 13/583; G01S 13/584; G01S 13/88; G01S 13/93; G01S 13/931; G01S 13/34; G01S 13/345; G01S 2013/0236; G01S 2013/0245; G01S 2013/9314; G01S 2013/9371; G01S 2013/9375; G01S 2013/9378; G01S 2013/9388; G01S 2013/89; H01Q 15/02; H01Q 15/04; H01Q 15/06; H01Q 15/08; H01Q 15/10; H01Q 15/12; H01Q 19/06; H01Q 19/062; H01Q 21/0006; H01Q 21/0031; H01Q 25/007; H01Q 25/008; H01Q 1/27; H01Q 1/34; H01Q 9/04; H01Q 9/0407; H01Q 21/0087; H01Q 21/06; H01Q 21/061; H01Q 21/065
USPC ..................... 342/5–11, 27, 28, 70–103, 118, 342/128–133, 175, 195, 22, 25 R, 25 A, 52, 342/147, 157, 158, 176, 179, 368–384; 343/700 R, 753–755, 907–910, 911 R, 343/911 L
See application file for complete search history.

(56) References Cited

U.S. PATENT DOCUMENTS
3,618,090 A * 11/1971 Garrison .................... 343/911 R
(Continued)

FOREIGN PATENT DOCUMENTS
CN 101291017 10/2008
(Continued)

OTHER PUBLICATIONS
Ravi Pratap et al.: "Design of Rotman Type Lens of Multiple Beam form", vol. 4, No. 4, Jul. 2009, pp. 248-256.
(Continued)

*Primary Examiner* — Bernarr Gregory

(57) ABSTRACT
A radar system (100) is described including a transmitting assembly (10), a receiving assembly (20), a control unit (30) and a signal processing unit (40). The transmitting assembly (10) receives an input signal (31) and transmits an incident radar signal (2). The transmitting assembly (10) includes a Rotman lens (12) having a lens cavity (74), a plurality of beam ports (60), a plurality of array ports (62) and a patch antenna assembly (14). The lens cavity (74) has a lens gap (h) between 10 microns to 120 microns, and preferably 40 microns to 60 microns. The patch antenna assembly (14) includes a plurality of antenna arrays (130) operable to receive a plurality of time-delayed, in-phase signals from the Rotman lens (12) and to transmit the incident radar signal (2) towards a target (4). The receiving assembly (20) receives a reflected radar signal (6) and produces an output signal. The signal processing unit (40) compares the input signal (31) to the output signal and implements an algorithm determining the range, velocity and position of the target (4).

29 Claims, 19 Drawing Sheets

(51) Int. Cl.
*G01S 7/35* (2006.01)
*H01Q 15/02* (2006.01)
*H01Q 19/06* (2006.01)
*H01Q 21/06* (2006.01)
*G01S 13/34* (2006.01)
*G01S 13/42* (2006.01)
*G01S 13/58* (2006.01)
*G01S 13/93* (2006.01)
*H01Q 1/34* (2006.01)
*H01Q 9/04* (2006.01)
*H01Q 21/00* (2006.01)
*H01Q 25/00* (2006.01)
*G01S 7/00* (2006.01)
*G01S 13/00* (2006.01)
*H01Q 15/00* (2006.01)
*H01Q 19/00* (2006.01)
*G01S 13/02* (2006.01)

(52) U.S. Cl.
CPC ............ *G01S 13/584* (2013.01); *G01S 13/931* (2013.01); *G01S 2013/0245* (2013.01); *H01Q 1/34* (2013.01); *H01Q 9/0407* (2013.01); *H01Q 21/0031* (2013.01); *H01Q 21/0087* (2013.01); *H01Q 25/008* (2013.01); *G01S 2013/9314* (2013.01); *G01S 2013/9375* (2013.01); *G01S 2013/9378* (2013.01); *G01S 2013/9385* (2013.01); *G01S 2013/9389* (2013.01)
USPC ........ 342/175; 343/700 R; 343/753; 343/907; 343/909; 342/5; 342/11; 342/27; 342/70; 342/118; 342/128; 342/130; 342/131; 342/132; 342/195

(56) References Cited

U.S. PATENT DOCUMENTS

| | | | | |
|---|---|---|---|---|
| 3,715,749 | A * | 2/1973 | Archer | 342/368 |
| 4,067,009 | A * | 1/1978 | Constant | 342/25 A |
| 4,085,404 | A * | 4/1978 | Gallant | 343/754 |
| 4,086,597 | A * | 4/1978 | Sinsky et al. | 343/754 |
| 4,288,795 | A * | 9/1981 | Shelton | 343/754 |
| 4,408,205 | A * | 10/1983 | Hockham | 342/368 |
| 4,472,719 | A * | 9/1984 | Hills | 342/370 |
| 4,490,723 | A * | 12/1984 | Hardie et al. | 343/754 |
| 4,532,520 | A * | 7/1985 | Hislop | 342/373 |
| 4,803,490 | A * | 2/1989 | Kruger | 342/75 |
| 4,937,584 | A * | 6/1990 | Gabriel et al. | 342/378 |
| 5,677,697 | A * | 10/1997 | Lee et al. | 342/368 |
| 5,734,345 | A * | 3/1998 | Chen et al. | 342/74 |
| 5,959,578 | A * | 9/1999 | Kreutel, Jr. | 342/373 |
| 6,107,956 | A | 8/2000 | Russell | |
| 6,441,785 | B1 * | 8/2002 | Rosen et al. | 342/383 |
| 6,686,867 | B1 * | 2/2004 | Lissel et al. | 342/70 |
| 7,019,682 | B1 * | 3/2006 | Louberg et al. | 342/22 |
| 7,119,733 | B2 * | 10/2006 | Schoeberl et al. | 342/70 |
| 7,170,442 | B2 * | 1/2007 | Lovberg et al. | 342/179 |
| 7,194,236 | B2 * | 3/2007 | Lovberg et al. | 342/22 |
| 7,248,204 | B2 * | 7/2007 | Lovberg et al. | 342/22 |
| 7,385,549 | B2 * | 6/2008 | Lovberg et al. | 342/22 |
| 7,415,244 | B2 * | 8/2008 | Kolinko et al. | 342/22 |
| 7,432,846 | B2 * | 10/2008 | Martin et al. | 342/22 |
| 7,692,571 | B2 * | 4/2010 | Lovberg et al. | 342/52 |
| 7,724,197 | B1 * | 5/2010 | Hardie et al. | 343/754 |
| 7,786,928 | B2 * | 8/2010 | Hansen et al. | 342/175 |
| 7,948,428 | B2 * | 5/2011 | Lovberg et al. | 342/27 |
| 2004/0027305 | A1 | 2/2004 | Pleva | |

FOREIGN PATENT DOCUMENTS

| | | |
|---|---|---|
| DE | 199 51 123 A1 | 2/2001 |
| JP | 8-334557 | 12/1996 |
| JP | 2002-71792 | 3/2002 |
| JP | 2002-309704 | 10/2002 |
| JP | 2003-248055 | 9/2003 |
| JP | 2005-9922 | 1/2005 |

OTHER PUBLICATIONS

Sinjari, A. and Chowdhury, S. "Design of PZT-Based MEMS Rotman Lens" IEEE CCECE/CCGEI, Niagara Falls, Canada, pp. 001121-001124 May 5-7, 2008.

Sinjari, A. and Chowdhury, S., "MEMS Automotive Collision Avoidance Radar Beamformer" IEEE, pp. 2086-2086, 2008.

WO2008093040A2 (Alder et al) Aug. 7, 2008 (Jul. 8, 2008).

* cited by examiner

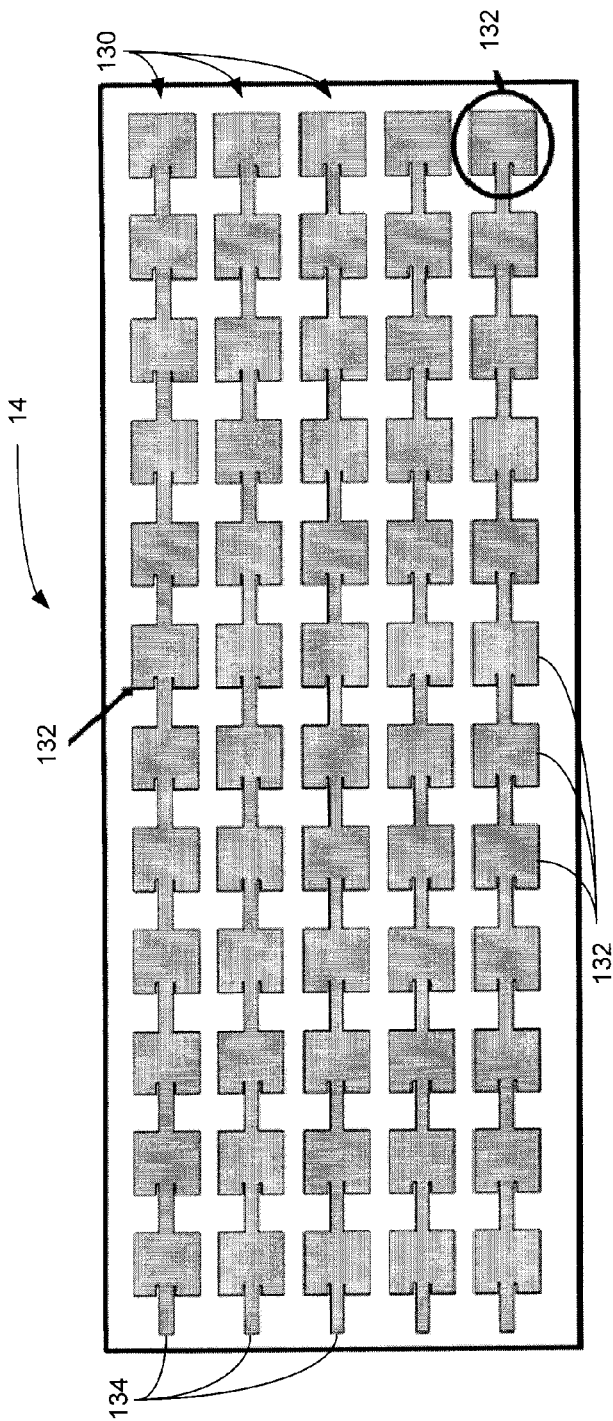
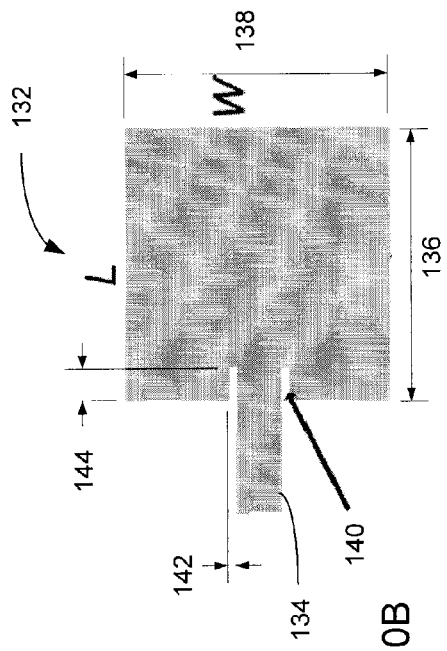
Figure 10A
Figure 10B

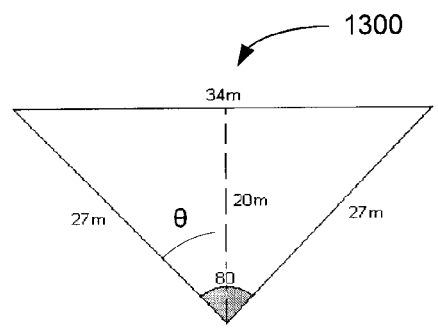
Figure 13A
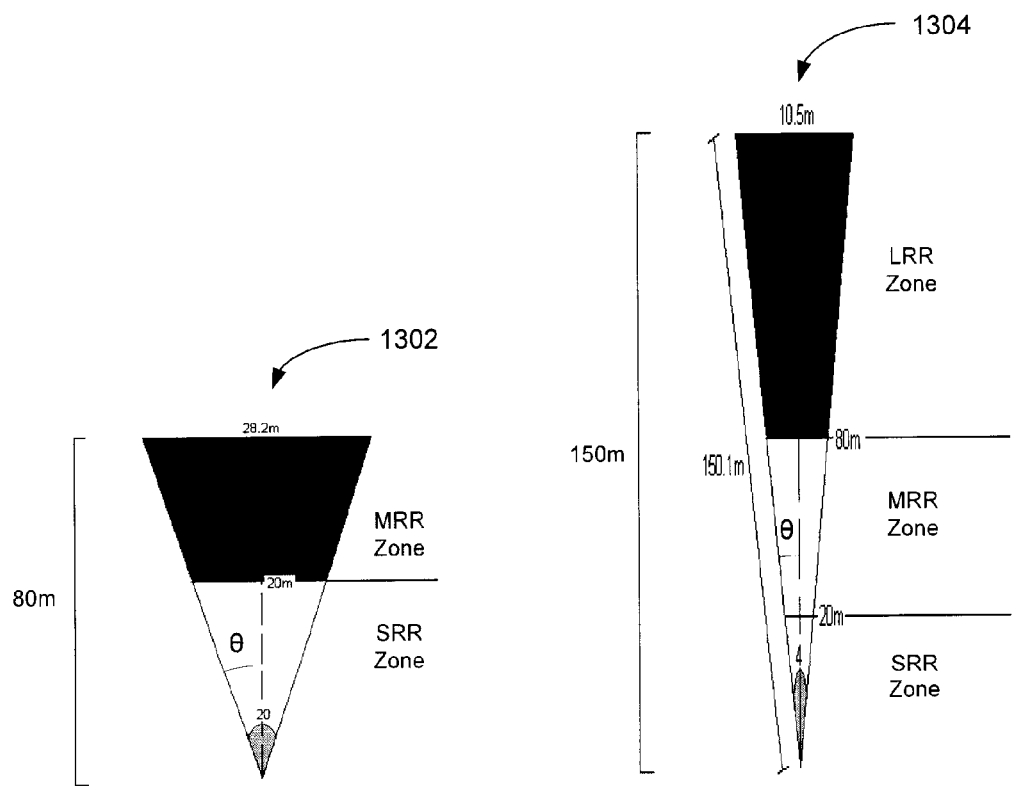
Figure 13B
Figure 13C

RADAR SYSTEM AND METHOD OF MANUFACTURING SAME

RELATED APPLICATIONS

This application claims the benefit of 35 USC 119(e) to U.S. Provisional Patent Application Ser. No. 61/282,595, filed 5 Mar. 2010.

FIELD OF THE INVENTION

This invention relates to micro-electromechanical systems (MEMS) radar systems for measuring the location, velocity and range of a target and methods of manufacturing. More particularly as will be described in a preferred embodiment, this invention relates to a radar system which includes: passive beamforming, circuit integration of electrical to electromagnetic to electrical to electromagnetic signal processing in the transmission and reception of a radar signal and multimodal capability.

BACKGROUND OF THE INVENTION

Radar systems are well known in the art to detect objects and targets using electromagnetic waves. Traditionally, radio waves or pulses have been transmitted by a radar dish or antenna to bounce off an object in their path. The reflected wave is then returned to a receiver and compared to the initially transmitted wave. Using known methods, the signal reflected from the target to the receiver is used to indicate both the position and/or velocity of the target relative to the transmitter and receiver.

Common radar systems use different methods for directing the transmitted signal (i.e. radar signal) in a desired target direction. Some prior art radar systems have been constructed using mechanically rotating antenna or with mechanical means for directing the radar signal. Other prior art radar systems have been designed using electronically controlled phased arrays which are composed of a group of antennas where the signal transmitted from the antennas are added in phase in such a way that the effective radiation pattern of the array is reinforced in a desired direction of propagation. Radar systems using phased arrays are able to control the angular direction of the radar signal quickly and accurately from a fixed position. Phased array systems also benefit from reduced transmission power requirements for any single antenna, allowing for stronger radar signals from antennae of specific power ratings.

To add the signals from the different antennas in a phased array radar system, different types of phase-shifters are known in the art. Research into micro-electromechanical system (MEMS) based RF switches is being conducted for use in radar systems, as MEMS-based phase-shifters provide low insertion loss, high isolation and fast response time in a small package. However, the circuitry necessary to form a phased array using MEMS-based RF switches can be complicated and the power requirements for such an array may be high.

A Rotman lens is a passive device for beam forming and for directing a radar signal. The design of a Rotman lens was first described by Walter Rotman in U.S. Pat. No. 3,170,158 (the Rotman Patent) and further in U.S. Pat. No. 4,381,509, which are herein incorporated by reference in their entirety. A Rotman lens utilizes the geometry of the lens cavity to adjust the phases of multiple input beams to provide real time beamforming and beam steering without the requirement for Radio Frequency (RF) switch-based phase shifters. Furthermore, as the Rotman lens forms a radar signal by exploiting the physical properties of the lens cavity without any form of microelectronic signal processing, the complexity of the control circuitry required for beamforming is dramatically reduced.

In an exemplary prior art application for motor vehicles, luxury manufacturers such as Mercedes®, BMW®, Lexus®, Jaguar®, Volvo®, and Ford® employ radar systems developed by manufacturers, such as Bosch®, Continental®, Infineon®, SmartMicro®, M/A-Com®, Hitachi® and Fujitsu®. Current radar systems rely upon two distinct radar technologies. Pulsed radars are employed by car manufacturers such as Mercedes®, while Frequency Modulated Continuous Wave (FMCW) radar systems are employed by car manufacturers, such as Jaguar® and BMW®. These prior art systems require mechanical rotation, utilizing an external motor, to scan through the desired field of view. Furthermore, some prior art systems incorporate discrete systems, such as a separate antennae arrays. Often, these prior art systems suffer from corrosion, but also inadequate resolution and range finding for driving at high speeds and the reliability of many prior art systems suffer in difficult driving conditions. Accordingly, there is a need for an improved radar system incorporating an integrated solution to provide superior performance.

Finally, prior art systems requiring mechanical scanning capabilities are subject to wear, tear and thermal drift. Pulsed or FMCW radar systems incorporating mechanical scanning are too expensive to be included in most mid-range or low-end vehicles.

Accordingly, the inventor has appreciated that a low cost collision avoidance and pre-crash warning system will improve highway driving dramatically, if it can be made affordable across a wider spectrum of manufacturers and vehicles. Additional embodiments may be operable in further vehicle types and other applications, including without restriction, robotics, boats, airplanes, toys and security systems.

SUMMARY OF THE INVENTION

Accordingly, it is an object of this invention to at least partially overcome some of the disadvantages of the prior art, by providing an improved type of radar system using MEMS technology to provide accurate and reliable radar signaling in a small device package at high speeds.

In one aspect, the invention incorporates a Rotman lens into the radar system. The Rotman lens is operable to generate a plurality of time delayed, in phase signals necessary for beamforming, by exploiting the physical geometry of the lens cavity, reducing processing requirements for electrical switches or microelectronics-based switching for phase-shifters.

Most preferably, electrical switches at RF frequencies (RF switches) can be used to select the beamports of the Rotman lens. The combination of RF switches and a Rotman lens reduces the amount of signal processing, resulting in lower system complexity, lower latency time and faster cycle time. In a most preferred mode of operation, the cycle time in a preferred embodiment maybe reduced to less than 50 ms, and more preferably approximately 12 ms. Furthermore, a radar system incorporating a Rotman lens constructed using MEMS technology results in a much smaller device package.

The radar system of the present invention preferably utilizes a Transverse Electric (TE) mode, air-filled Rotman lens. More preferably the Rotman lens is selected to operate in TE10 mode and is constructed using MEMS technology. This novel implementation is in contrast to TEM mode microstrip or waveguide-based Rotman lenses of prior art systems. Utilizing MEMS technology to construct the Rotman lens from a substrate, such as silicon-based substrates, enables the construction of a Rotman lens with a reduced lens thickness to 50 micrometers. An easy fabrication technique has been developed for the silicon based Rotman lens. The overall radar system exhibits lower 1/f noises, a small foot print area, lower interference from other users and Pulse radar signals, a high reflection intensity, and a large radar cross section (RCS). Furthermore, constructing the Rotman lens using MEMS technology allows the entire radar system to be incorporated into a small device package.

In a most preferred construction, the present invention resides in a radar system. The radar system includes a transmitting assembly, a receiving assembly, a control unit and a signal processing unit. The transmitting assembly receives an input signal and transmits an incident radar signal. The transmitting assembly includes a Rotman lens having a lens cavity, a plurality of beam ports, a plurality of array ports and a patch antenna assembly. The lens cavity is defined by a bottom, a top and a sidewall, wherein the bottom is separated by the top to form a lens gap between 10 microns to 120 microns, and preferably 40 microns to 60 microns. The plurality of beam ports is in communication with the lens cavity and is spaced towards a first end, wherein each beam port is configured to allow the propagation of an electromagnetic wave having a frequency at a selected wavelength ($\lambda$) into the lens cavity. The plurality of array ports is in communication with the lens cavity and is spaced towards a second end of the lens cavity opposite the first end, wherein the spacing of the plurality of array ports is configured to affect the phase shift of the electromagnetic wave from each of the beam ports to all of the array ports. Furthermore, the plurality of array ports outputs a plurality of time-delayed, in-phase signals based on the electromagnetic wave entering the lens cavity from one of the plurality of beam ports. The patch antenna assembly includes a plurality of antenna arrays, wherein each antenna array is in communication with one of the array ports, and wherein the plurality of antenna arrays is operable to receive the plurality of time-delayed, in-phase signals from the Rotman lens and to transmit the incident radar signal in a selected direction towards a target. The receiving assembly is for receiving a reflected radar signal from the target and for producing an output signal. The control unit is for operating the radar system. The signal processing unit is for comparing the input signal sent to the transmitting assembly and the output signal produced by the receiving assembly and then for implementing an algorithm to determine the range, velocity and position of the target.

In another aspect, the present invention resides in a method of manufacturing a Rotman lens. The method includes the steps of providing a first substrate for forming the bottom portion of the Rotman lens; placing an oxide mask on the first substrate using a lithographic process; etching the first substrate using a Deep Reactive Ion Etch (DRIE) process to form the bottom portion; providing a second substrate for forming the top portion of the Rotman lens, and finally bonding the top and the bottom portions of the Rotman lens using thermocompression bonding and conductive epoxy to make the Rotman lens.

Further and other features of the invention will be apparent to those skilled in the art from the following detailed description of the embodiments thereof.

BRIEF DESCRIPTION OF THE DRAWINGS

Reference may now be made to the following detailed description taken together with the accompanying drawings in which:

FIG. 10A shows a patch antenna assembly operable in a single mode comprising linear arrays of microstrip patches in accordance with an embodiment of the present invention;

FIG. 10B shows an inset microstrip patch forming part of a linear array, as illustrated in FIG. 10A;

FIG. 13A-FIG. 13C show a plurality of modes of the radar system operating in short radar range, medium radar range, and long radar range modes in accordance with an embodiment of the present invention;

DETAILED DESCRIPTION OF THE PREFERRED EMBODIMENTS

Figure 1:
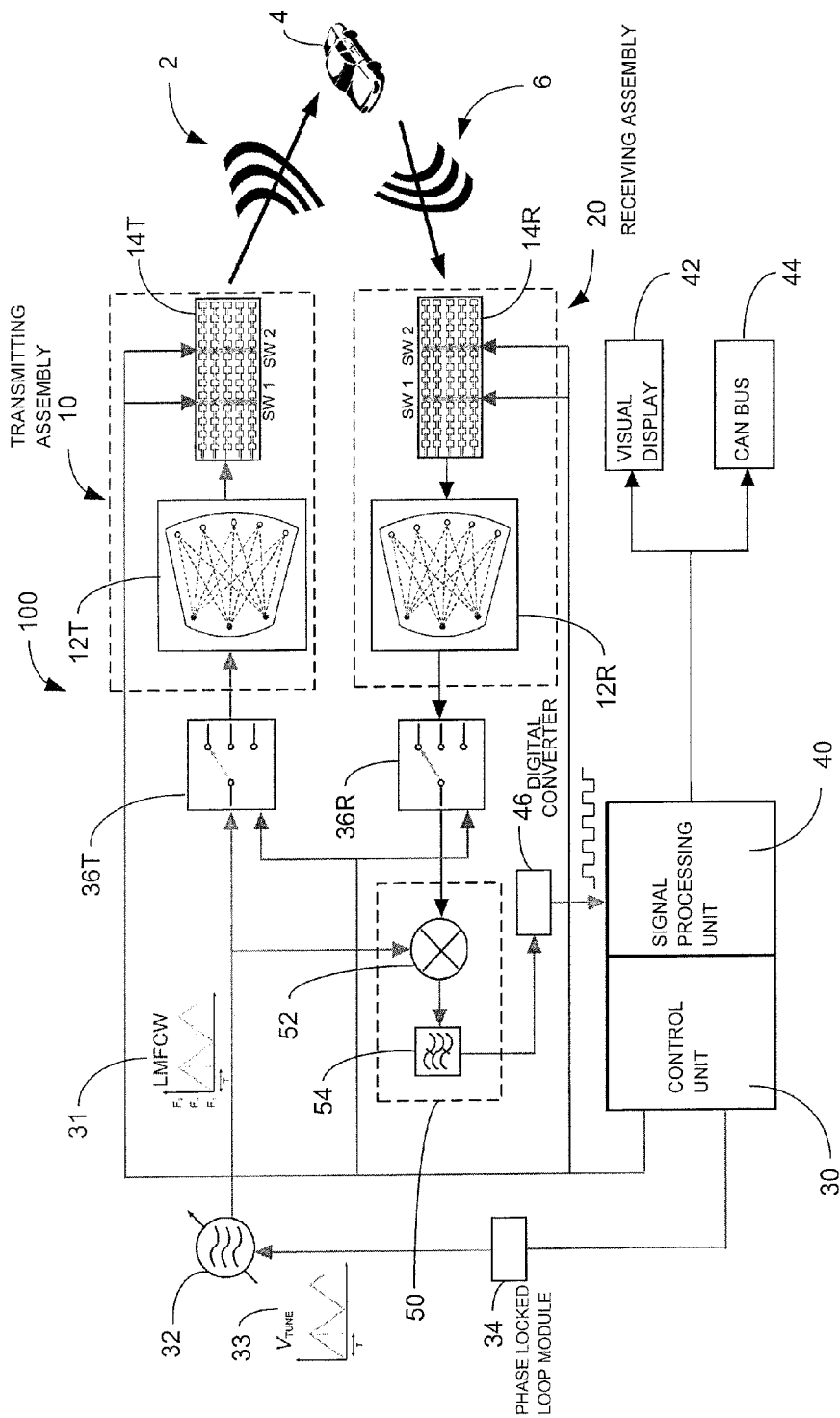
FIG. 1 shows a schematic diagram of a radar system in accordance with an embodiment of the present invention.
Figure 12:
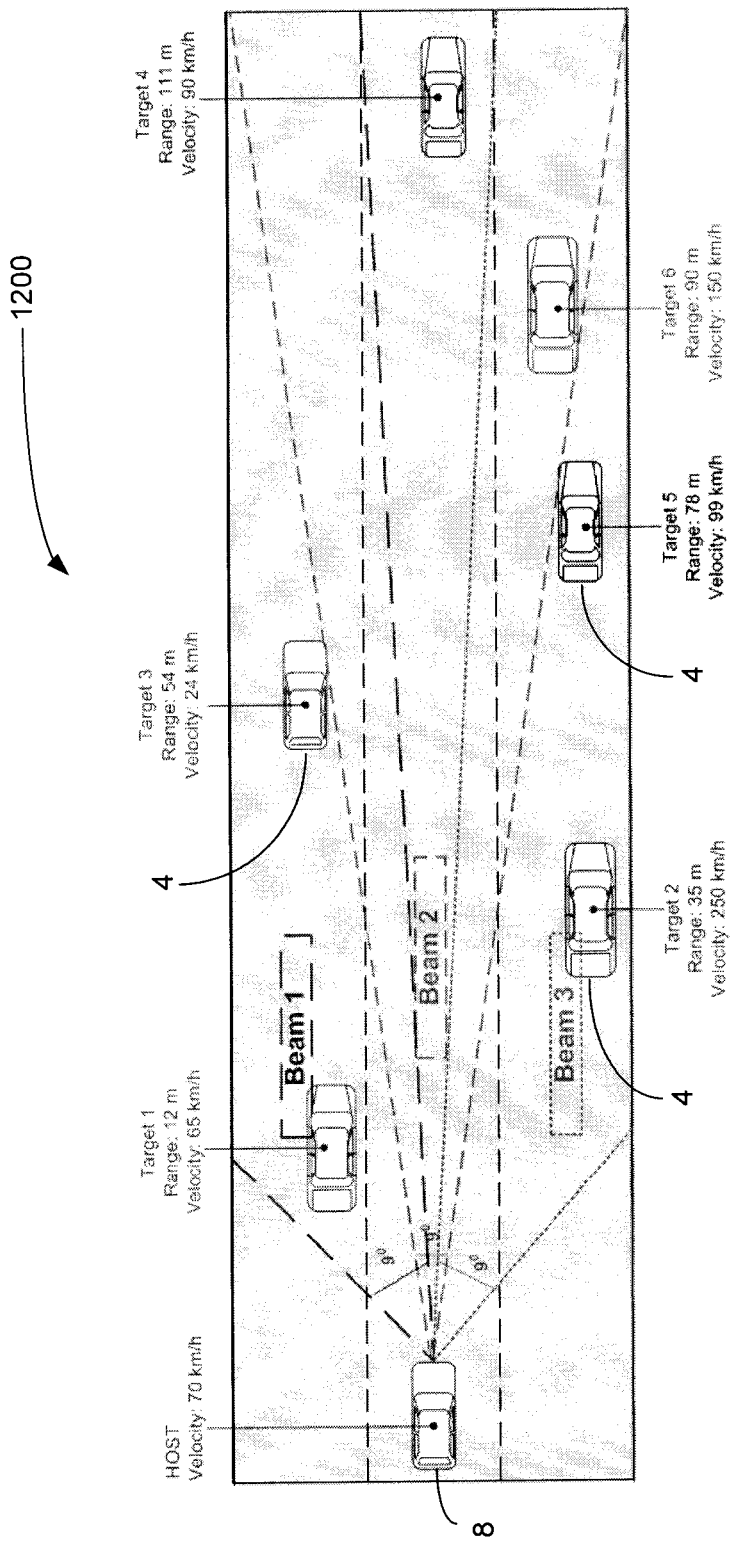
FIG. 12 shows a highway illustration of the capabilities of a radar system operating in multiple modes in accordance with an embodiment of the present invention.

Reference is made to FIG. 1, which shows schematically a radar system 100 in accordance with an embodiment of the present invention. The radar system 100 has an overall size selected to enable its mounting on or in the bumper of a host vehicle 8 (FIG. 12). The radar system 100 includes a transmitting assembly 10, a receiving assembly 20, a control unit 30, and a signal processing unit 40. As will be described, the transmitting assembly 10 is operable to transmit an incident radar signal 2 at the target vehicle 4. The receiving assembly 20 is operable to receive the reflected radar signal 6 from the target vehicle 4, and which is then processed by the signal processing unit 40 to extract information relating to the location, speed and/or direction of the target vehicle 4 and then provided to the user as an output 5. The reflected radar signal 6 optionally may be subjected to analog filtering prior to being passed to the signal processing unit 40. For example, an analog filter assembly 50 may be used to mix the reflected radar signal 6 with the incident radar signal 2 using a mixer 52. Furthermore, one or more filters may be incorporated into the filtering assembly 50, such as a low pass filter (LPF) 54.

By comparing the reflected radar signal 6 with the incident radar signal 2, the signal processing unit 40 may be operable to determine such parameters of the target vehicle 4 as: target location, target velocity and target range. This information may be fed into the host vehicle navigation system (not shown), to a dashboard and/or other display type, and the like, to provide driver notification information in the form of an output audio signal or visual display 42. In an alternate embodiment, output information may be fed directly to a control system for autonomous vehicle or semi-autonomous navigation and/or control, such as, for example, through the Controller Area Network Bus (CAN Bus) 44. The signal processing unit 40 incorporates digital signal processing. A digital to analog converter (DAC) circuit is used to generate a tuning voltage for the transceiver to generate the chirp signal. A low pass filter is used to filter and amplify a selected range of the intermediate frequency signal (IF), which is then converted into a digital signal using an analog to digital converter (ADC). 46.

As will be described, the transmitting assembly 10 includes a transmitting Rotman lens 12T for beamforming and a transmitting patch antenna assembly 14T for transmitting the incident radar signal 2. As mentioned, a transmitting Rotman lens 12T is used to adjust the phase of the input signal and to provide real time beam forming and beam steering.

Figure 3A:
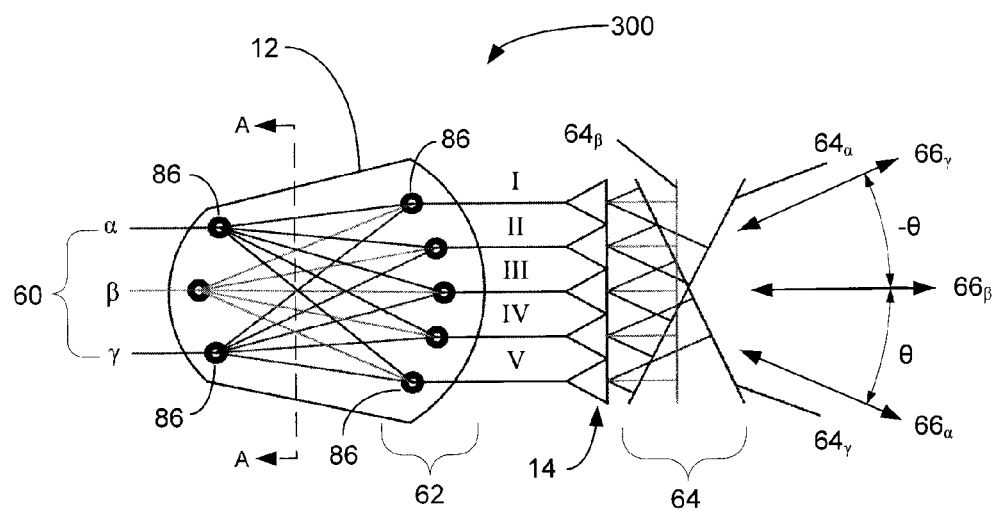
FIG. 3A shows a functional schematic diagram of a Rotman lens and patch antenna assembly.
Figure 3B:
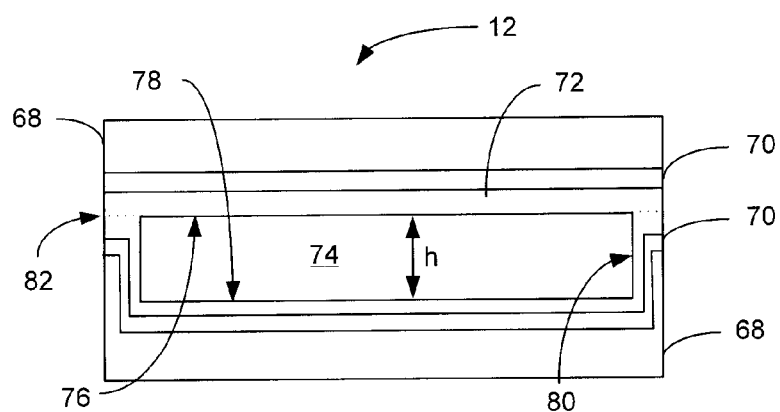
FIG. 3B shows cross-sectional view of the Rotman lens illustrated in FIG. 3A along cut-line A-A in accordance with an embodiment of the present invention.

The receiving assembly 20 is preferably configured in a similar manner to the transmitting assembly 10, and includes a receiving Rotman lens 12R and a receiving patch antenna assembly 14R. The Rotman lenses 12T, 12R and the patch antenna assemblies 14T, 14R may have substantially identical construction and may be configured to operate with similar, if not identical parameters. Returning now to the Rotman lens 12 within the radar system 100, FIG. 3A illustrates the basic functions of a Rotman lens 12, as described as part of either the transmitting assembly 10 or the receiving assembly 20. It should be understood that some components of the transmitting assembly 10 and receiving assembly 20 have been omitted in order not to obfuscate the operation of the Rotman lens 12 in combination with the transmitting assembly 14. FIG. 3B shows a cross-sectional view 300 of the lens 12 taken along the cut-line A-A of FIG. 3A. The general construction of each Rotman lenses is best shown in FIGS. 3A, 3B, 4 and 5, with each patch antenna assemblies 14T, 14R best shown in FIGS. 10A, 10B and 11 referred to generally as a Rotman lens 12 and a patch antenna assembly 14, respectively.

Referring briefly to FIG. 3A, the Rotman lens 12 includes three beam ports 60 (shown $\alpha$, $\beta$, $\gamma$) spaced towards a first end, and a five array ports 62 spaced towards its second other end. A number of microwave interconnect devices 86 are each associated respectively with each beam port 60 and array port 62, and are operable to convert electrical signals to electromagnetic waves and vice versa. As shown best in FIG. 3B, the Rotman lens 12 includes a lens air cavity 74 which is defined by generally parallel spaced top and bottom walls 76, 78 and a peripherally extending sidewall 80. The top and bottom walls 76, 78 are spaced from each other by a lens gap h of preferably selected at less than one half the wavelength ($\lambda/2$) of the electromagnetic wave to be propagated through the lens 12. The beam ports 60 and array ports 62 are shown best in FIGS. 4 and 5 as extending generally into opposing sides of the air cavity 74. Most preferably the beam ports 60 and array ports 62 of each series are provided with respectively geometrics and lengths which are substantially the same. A Rotman lens 12 is configured to include a plurality of beam ports 60 in communication with the lens cavity 74 and a plurality of array ports 62 also in communication with the lens cavity 74. The beam ports 60 are spaced at one end of the lens cavity 74 and the array ports 62 are spaced at a second end of the lens cavity 74, opposite to the beam ports 60. Although any number of beam ports 60 and any number of array ports 62 may be included in the design of a Rotman lens 12, common combinations of beam port 60 to array ports 62 are well known in the art. For example, the Rotman lens illustrated in FIG. 3A has three beam ports 60 labeled $\alpha$, $\beta$, $\gamma$ and five array ports labeled I, II, III, IV and V.

When part of the transmitting assembly 10, the beam ports 60 of the Rotman lens 12T operate to receive input signals 31 and the array ports 62 operate to output the corresponding signals to the transmitting patch antenna assembly 14T. Functionally speaking, the input signal 31 is converted to an electromagnetic wave at its input beam port 60 ($\alpha$, $\beta$, $\gamma$) for propagation across the cavity 74 of the transmitting Rotman lens 12T. In this regard, the series of associated microwave interconnect devices 86 are positioned within each beam port 60 and are operable to convert the input electrical signal 31 to the electromagnetic signal to be propagated through the lens 12T. The signals output at the array ports 62 of the transmitting Rotman lens 12T are based on the incoming electromagnetic wave propagated from received at one of the beam ports 60 and which arrive at all of the array ports 62. The electromagnetic signal received at each of the array ports 62 is converted to an electrical signal by another microwave interconnect device 86 and is output collectively by the array ports 62 as time-delayed, in-phase electrical signals. The transmitting patch antenna assembly 14T is configured to receive the time-delayed, in phase electrical signals from the array ports 62 of the Rotman lens 12T via a semi-rigid coaxial cable, and converts the electrical signals back to electromagnetic signals at the transmitting patch antenna assembly 14T. The electromagnetic signals are thus then transmitted as the incident radar signal 2 in a selected direction 66 having regard to the combination of the geometry of the Rotman lens 12T and the construction of the patch antenna assembly 14T.

It should be understood that the input signal 31 generated by a signal generator 32 may be outputted by the signal generator 32 as an electrical signal. Accordingly, the input signal 31 is required to be transformed between an electric signal and an electromagnetic signal by a suitable microwave interconnect device 86. Preferably, the microwave interconnect device 86, is a G3PO™ Interconnect Series from Corning Gilbert Inc., and which is a nano-miniature, push-on, high performance, microwave interconnect device developed in response to industry demand for increased package density, lower weight, and performance at higher frequencies. Accordingly, the microwave interconnect device 86 may be installed in each of the beam ports 60 of the transmitting Rotman lens 12T to convert the input signal 31 to an electromagnetic wave and in each array port of the transmitting Rotman lens 12T to convert each of the electronic waves to a plurality of time-delayed, in-phase signals.

As described hereafter, the Rotman lens 12R operating as part of the receiving assembly 20 operates in a manner to the Rotman lens 12T of the transmitting assembly 10 but in the reverse order.

The applicant has appreciated that with the present invention, the Rotman lens 12 does not require complicated and expensive RF switch-based phase shifters to generate the time-delayed, in-phase signals. Accordingly, the Rotman lens 12 in the transmitting assembly 10 and receiving assembly 20 is a passive device, resulting in reduced complexity and improved efficiency, as no control circuitry is required. Furthermore, the Rotman lens 12 does not require any power to operate and can be designed for low insertion loss, using known wave guide techniques.

Figure 19:
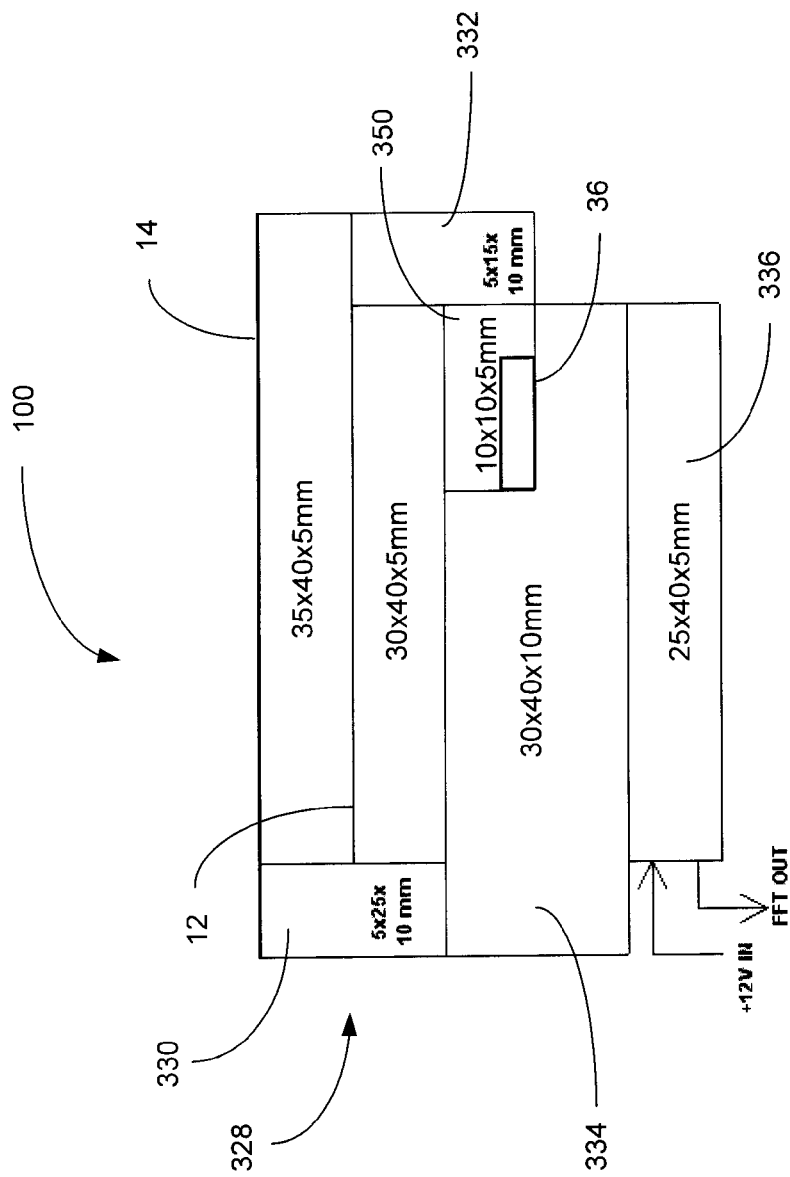
FIG. 19 shows an exemplary schematic diagram for a radar system having a single transmitting/receiving assembly in accordance with a further preferred embodiment of the present invention.

Returning to FIG. 1, it should be understood that the receiving assembly 20 may take multiple different forms. For example, in one embodiment, the receiving assembly 20 may include active devices (not shown) to provide improved resolution over passive devices (such as a receiving assembly 20 including receiving Rotman lens 12R). In another embodiment, the transmitting assembly 10 may be operable to both transmit the incident radar signal 2 to the target vehicle 4 and receive the reflected radar signal 6, using the same components. In such a configuration, the radar system 100 may be said to include a simple transmitter/receiver assembly and may incorporate multiplexing or circulator components and special filtering to reduce the components relative to the transmitting assembly 10 and receiving assembly 20. An exemplary embodiment using a single transmitter/receiver assembly is illustrated in FIG. 19 and will be described below.

In the radar system 100 the control unit 30 is provided for the overall operation of the radar system 100. The control unit 30 is provided with a dedicated processor or alternatively implemented on a microcontroller, an application specific integrated circuit (ASIC), a field programmable gate array (FPGA), a computer, or the like. Preferably, the control unit 30 and the signal processing unit 40 may be implemented on the same device, such as an ASIC or FPGA. Further, while some resources of the control unit 30 may be directed towards controlling the radar system 100, other resources may be utilized to interpret the reflected radar signal 6.

The control unit 30 preferably provides a plurality of control signals for operating the radar system 100. For example, the control unit 30 is used to activate the signal generator 32, which in turn generates the input signal 31 to be sent to the transmitting assembly 10. The control unit 30 may incorporate a phase locked loop module 34 to ensure the proper operation of the signal generator 32. For example, the control unit 30 may operate to send reference signals 33 to the signal generator 32 via the phase locked loop module 34. The control unit 30 may also generate control signals to be sent to the different components of the radar patch antenna assembly 100. Preferably, the control unit 30 is operable to send control signals to switching devices 36T, 36R associated respectively with the transmitting assembly 10 and/or the receiving assembly 20. Switching device 36T is operable to electronically connect the signal generator 32 to the Rotman lens 12T of the transmitting assembly 10. Switching device 36R is operable to electronically connect the Rotman lens 12R of receiving assembly 20 to the signal processing unit 40 via an analog filter assembly 50 and ADC 46. The switching devices 36T, 36R most preferably have the identical construction, generally referred to herein as a switching device 36 and are provided as a single-pole-triple-throw (SP3T) switch 900, as will be later discussed with reference to FIG. 9.

From a systems level perspective, the radar system 100 can be segregated into the operations of generating/transmitting an incident radar signal 2; and thereafter receiving/processing a reflected radar signal 6 from one or more target vehicles 4, such as for example illustrated schematically in FIG. 12.

Figure 2A:
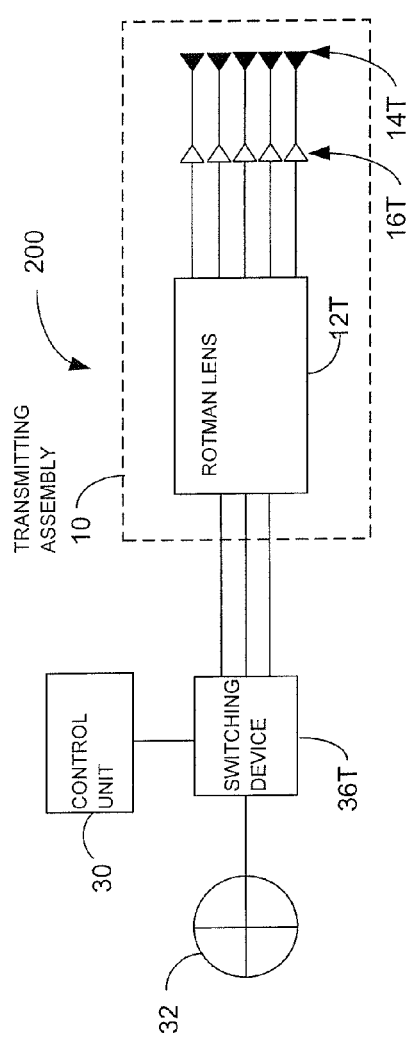
FIG. 2A shows a functional block diagram of generating and transmitting a radar signal in accordance with an embodiment of the present invention.

FIG. 2A shows a functional block diagram of a generating and transmitting system 200 for generating the incident radar signal 2 in accordance with an embodiment of the present invention. The input signal 31 is first generated by the signal generator 32. Although many frequencies are possible, preferably the signal generator 32 is operable to provide electrical signals 31 selected to achieve higher frequencies such as between 20 GHz and 100 GHz, and more preferably between 70 GHz and 85 GHz. When used for vehicle radar applications, the radar system 100 most preferably is configured to operate at and around 77 GHz±1 GHz, however, it should be understood that alternate frequencies are possible for different applications.

The input signal 31 is then fed to the switching device 36T which is regulated by the control unit 30 and selects which of the plurality of beam ports 60 is to receive the input signal 31. When operating as part of the transmitting assembly 10 (i.e., from left to right in FIG. 3A), only one of the beam ports 60 of the transmitting Rotman lens 12T is operable to propagate an electromagnetic wave across the lens cavity 74 at a given time. However, for an electromagnetic wave propagated across the lens cavity 74, each of the array ports 62 will output a time-delayed, in-phase signal based on the path length from each beam port α, β, γ to each array port I, II, III, IV, V. For example, if an input signal 31 is received at the specific beam port α, the electrical signal converted to an electromagnetic wave by the microwave interconnect device 86 will propagate across the lens cavity 74, based on the geometry of the lens cavity 74. The electromagnetic wave will then arrive at each of the array ports 62 at different times, but still in-phase. The plurality of time-delayed, in-phase signals is then converted back to electrical signals by additional microwave interconnect devices 86 at the array ports 62 and is received by the transmitting patch antenna assembly 14T to be transmitted as the incident radar signal 2. Each beam port α, β, γ is associated with an incident radar signal 2 in a selected direction 66 (i.e. with a unique transmit angle $66_\alpha$, $66_\beta$, $66_\gamma$.

The plurality of time-delayed, in-phase signals are then output by the transmitting Rotman lens 12T. Preferably, the time-delayed, in-phase signals are buffered and/or amplified by an array of transmitting Monolithic Microwave Integrated Circuit amplifiers (MMIC amplifiers) 16T, before being transmitted as the incident radar signal 2 by the transmitting patch antenna assembly 14T.

Transmitting MMIC amplifiers 16T are operable on electrical signals only. Accordingly, where transmitting MMIC amplifiers 16T are used to buffer and/or amplify the time-delayed, in-phase signals from the array ports 62 of the transmitting Rotman lens 12T, additional microwave interconnect devices 86 may be installed between the transmitting Rotman lens 12T and the transmitting patch antenna assembly 14T.

The inventor has appreciated that transforming the signals back and forth between electrical and electromagnetic signals prior to being transmitted as the incident radar signal 2 is beneficial in reducing the size of the radar system 100. Accordingly, the microwave interconnect devices 86 operate to effect the transformation between an electrical signal to an electromagnetic signal or between an electromagnetic signal to an electric signal. Amplifiers and switches operable to transform electrical signals can then be designed using MEMS and stripline/microstrip technology. Furthermore, the inventor has appreciated that incorporating a passive device operating on an electromagnetic signal (i.e. Rotman lens 12T) into an electrical assembly, greatly reduces the signal processing requirements of the radar assembly 100 and additionally, reduces costs. Further, a hybrid system incorporating both electromagnetic and electrical components improves the speed of the radar system 100 relative to systems which rely upon strictly electrical or strictly electromagnetic components.

Figure 2B:
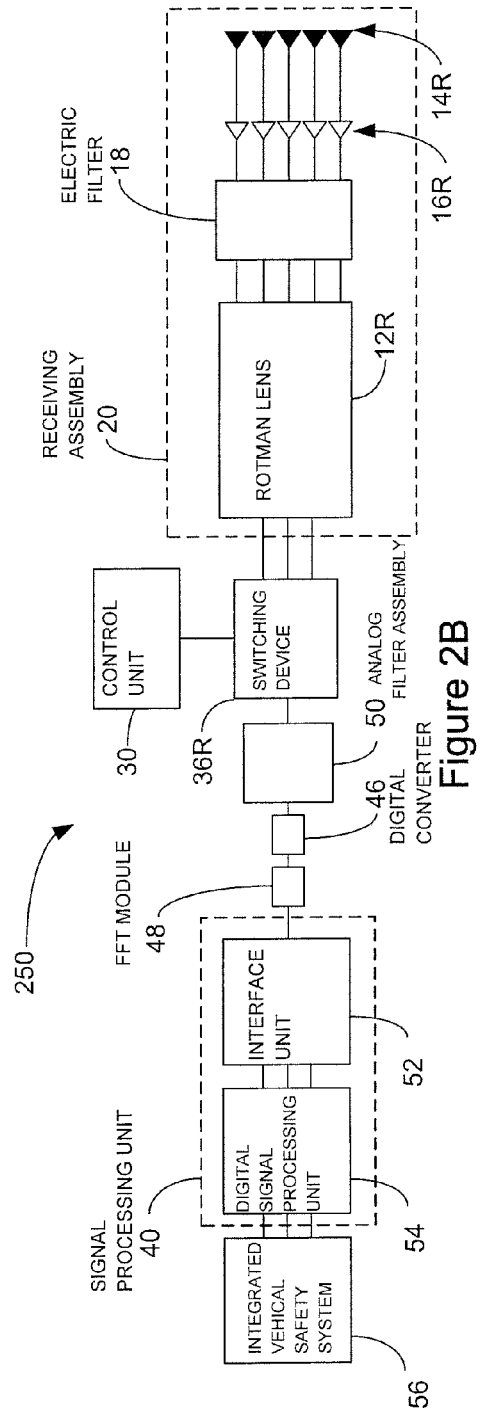
FIG. 2B shows a functional block diagram of receiving and processing a radar signal in accordance with an embodiment of the present invention.

FIG. 2B shows a functional block diagram of a receiving and processing system 250 for receiving a reflected radar signal 6. The design of the receiving/processing system 250 may mirror the generating/transmitting system 200, as illustrated in FIG. 2A, except that the propagation of the received reflected radar signal 6 is operable in reverse. Specifically, the receiving/processing system 250 includes both a receiving Rotman lens 12R and a receiving patch antenna assembly 14R. The receiving patch antenna assembly 14R in the receiving/processing system 250 is operable to receive the reflected radar signal 6, instead of transmitting the incident radar signal 2. The receiving Rotman lens 12R operates to receive a plurality of time-delayed, in-phase signals and output an electromagnetic wave, in reverse operation to the transmitting Rotman lens 12T in the transmitting assembly 10 and generating/transmitting system 200.

Preferably, as illustrated in FIG. 2B, a reflected radar signal 6 is received at the receiving patch antenna assembly 14R of the receiving/processing system 250 and connected to electrical signals. The reflected electrical signal is amplified by the receiving MMIC amplifiers 16R. The amplified signals are subsequently optionally filtered by a suitable electric filter 18 and fed into each of the array ports 62 of receiving Rotman lens 12R as a plurality of time-delayed, in-phase signals. The microwave interconnect devices 86 placed in each array port 62 of the receiving Rotman lens 12R converts the electrical signals output by the MMIC amplifiers 16R to electromagnetic waves for propagation through the cavity 74 of the lens 12R to the beam ports 60. Upon exiting the beam ports 60 of the receiving Rotman lens 12R, the single electromagnetic wave is converted back to an electrical signal by the further microwave interconnect devices 86 located at each beam port 60. The output electrical signals are next converted to a digital signal by an analog to digital converter (ADC) 46. The digital signal may then be fed into the signal processing unit 40. Alternately, the electromagnetic wave may undergo filtering (such as by the filtering assembly 50) prior to conversion. Furthermore, the electronic signal may be shifted to an intermediate frequency (IF) prior to being sampled by the ADC 46 to allow less sophisticated analog to digital converters 46 (e.g. with slower sample rates) to be used.

In the signal processing unit 40, the signal may be converted from a time-domain signal to a frequency-domain signal by an FFT module 48, which may be subsequently fed to an interface unit 52 and on to a digital signal processing unit (DSP) 54 and Integrated Active Vehicle Safety System (IAVSS) 56. The information derived from the radar system 100 may be displayed to an operator of the radar system 100 and/or communicated to an advanced control system (not shown) for further processing and decision making purposes.

In operation of the radar system 100, the wave front lines 64 (FIG. 3A) may be considered a wave front $64_\alpha$, $64_\beta$, $64_\gamma$ of the incident radar signal 2 for an input signal 31 received at each respective beam port α, β, γ. The wave front $64_\alpha$, $64_\beta$, $64_\gamma$ shows the alignment of the time-delayed, in-phase signals transmitted by the patch antenna assembly 14. Each wave front $64_\alpha$, $64_\beta$, $64_\gamma$ is orthogonal to the direction of propagations of the incident radar signal 2, or selected directions 66, where each selected direction $66_\alpha$, $66_\beta$, $66_\gamma$ is determined by the configuration of the Rotman lens 12, including the number and placement of both beam ports 60 and array ports 62, and the design of the patch antenna assembly 14. Accordingly, an electromagnetic wave received at a specific beam port α, β, γ will result in an incident radar signal 2 in the selected direction 66, orthogonal to its corresponding wave front $64_\alpha$, $64_\beta$, $64_\gamma$ as illustrated in FIG. 3A.

Generally speaking, the arrangement of the plurality of beam ports 60 and the plurality of array ports 62 will be symmetrical about a central axis of the Rotman lens 12 for easy beam forming and configuration. For example, the specific beam ports α, β, γ and specific array ports I, II, III, IV, V will be arranged symmetrically such that the selected direction 66 for specific beam port β is 0° or orthogonal to the patch antenna assembly 14. Furthermore, the selected direction 66 for the specific beam ports α and γ may be configured to be θ and −θ, respectively.

When operating as part of the receiving assembly 20 (from right to left in FIG. 3A), the receiving Rotman lens 12R receives a reflected radar signal 6 at the receiving patch antenna assembly 14R. The receiving patch antenna assembly 14R is operable to receive the reflected radar signal 6 at different physical locations resulting in a plurality of time-delayed, in-phase signals. These signals are then fed into the array ports 62 of the Rotman lens 12R where they are converted to electromagnetic signals by the microwave interconnect devices 86 located at each array port 62. As the received time-delayed, in-phase signals are likely to be weak, an array of amplifiers 16R (such as shown in receiving/processing system 250 in FIG. 2B) are included to boost the signal strength of the reflected radar signal 6.

The specific array ports 62 I, II, III, IV, V are operable to receive each signal in sequence in a sequenced time-delayed, in-phase manner from the receiving patch antenna assembly 14R. The signals are then propagated back through the lens cavity 74 of the Rotman lens 12 to the beam ports 60 as an in-phase electromagnetic wave. The beam ports 60 are then operable to receive the plurality of time-delayed, in-phase signals from the lens cavity 74 and combine the signals into a single electromagnetic wave at one of the beam ports 60. It should be understood that as the Rotman lens 12 is a passive device, it is likely there will be a measurable output at all the beam ports 60, for any reflected radar signal 6. However, for a reflected radar signal 6 received from a selected direction 66, the electromagnetic wave will be received first at the beam port 60 corresponding to the transmitting beam port 60 of the Rotman lens 12T. The single electromagnetic wave at the specific beam port 60 α, β, γ is then converted to an electrical signal by the microwave interconnect device 86 and outputted to the radar system 100.

When acting as part of a receiving assembly 20, the Rotman lens 12R is designed to passively combine the plurality of time-delayed in-phase signals into a single electromagnetic wave. Based on the geometry of the Rotman lens 12R (i.e. the path lengths from each array port 62 I, II, III, IV, V to each specific beam port 60 α, β, γ) and the design of the patch antenna assembly 14, the usable electromagnetic wave outputted by a specific beam port α, β, γ is the electromagnetic wave received from the same selected direction 66 as the transmitting assembly 10. For example, a reflected radar signal 6 received at the patch antenna assembly 14 from selected direction 66$_β$, a direction orthogonal to the wave front 64$_β$ (i.e. square to the patch antenna assembly 14), will arrive as a single electromagnetic wave at beam port 60 β. The selected direction 66$_β$ is the direction the incident radar signal 2 takes when the input signal is transmitted through specific beam port 60 β by the transmitting assembly 10. Similarly, a reflected radar signal 6 received at the patch antenna assembly 14 from selected direction 66$_γ$, will arrive as a single electromagnetic wave at beam port γ when first transmitted by the corresponding beam port γ of the transmitting assembly 10. Accordingly, each beam port 60 α, β, γ in the receiving assembly 20 is associated with receiving a reflected radar signal 6 from a selected direction 66 (i.e. from a unique scan angle 66$_α$, 66$_β$, 66$_γ$), which in turn corresponds to a incident radar signal 2 initially transmitted through the corresponding beam port 60 α, β, γ in the transmitting assembly 10.

In a preferred mode of operation, the transmission of an incident radar signal 2 and the reception of a reflected radar signal 6 through the transmitting Rotman lens 12T and the receiving Rotman lens 12R operate as follows:

(A) Transmission of the incident radar signal 2 using the beam port 60 α in the transmitting Rotman lens 12T and reception of the reflected radar signal 6 using the beam port 60 α in the receiving Rotman lens 12R i) in the transmitting assembly 10:
  switching device 36T sends electric signal to the beam port 60 α of transmitting Rotman lens 12T
  after conversion by microwave interconnect device 86, electromagnetic wave is propagated across lens cavity 74
  time-delayed in-phase signals arrive at array ports 62 I, II, III, IV, V in sequence
  time-delayed in-phase signals are converted back to electric signals by microwave interconnect devices 86 and are sent to the transmitting patch antenna assembly 14T
  incident radar signal 2 is transmitted by the transmitting patch antenna assembly 14T in the selected direction 66α
  incident radar signal 2 bounces off the target vehicle 4 ii) in the receiving assembly 20:
  reflected radar signal 6 is received by the receiving patch antenna assembly 14R from the selected direction 66α
  reflected radar signal 6 arrives at the array ports 62 V, IV, III, II, I in sequence at the receiving Rotman lens 12R
  after conversion by the microwave interconnect devices 86, the time-delayed in-phase signals are propagated across the lens cavity 74 to the beam ports 60 of the receiving Rotman lens 12R
  electromagnetic signal at beam port 60 α is converted to an electric signal by a microwave interconnect device 86 and outputted to the receiving switching device 36R
  output signal is directed to the signal processing unit 40 for processing by the receiving switching device 36R (B) Transmission of the incident radar signal 2 using the beam port 60 β in the transmitting Rotman lens 12T and reception of the reflected radar signal 6 using the beam port 60 β in the receiving Rotman lens 12R i) in the transmitting assembly 10:
  switching device 36T sends electric signal to the beam port 60 β of transmitting Rotman lens 12T
  after conversion by microwave interconnect device 86, electromagnetic wave is propagated across lens cavity 74
  time-delayed in-phase signals arrive at array ports 62 I, II, III, IV, V at the same time
  time-delayed in-phase signals are converted back to electric signals by microwave interconnect devices 86 and are sent to the transmitting patch antenna assembly 14T
  incident radar signal 2 is transmitted by the transmitting patch antenna assembly 14T in the selected direction 66β
  incident radar signal 2 bounces off the target vehicle 4 ii) in the receiving assembly 20:
  reflected radar signal 6 is received by the receiving patch antenna assembly 14R from the selected direction 66β
  reflected radar signal 6 arrives at the array ports 62 V, IV, III, II, I at the same time at the receiving Rotman lens 12R
  after conversion by the microwave interconnect devices 86, the time-delayed in-phase signals are propagated across the lens cavity 74 to the beam ports 60 of the receiving Rotman lens 12R
  electromagnetic signal at beam port 60 β is converted to an electric signal by a microwave interconnect device 86 and outputted to the receiving switching device 36R
  output signal is directed to the signal processing unit 40 for processing by the receiving switching device 36R (C) Transmission of the incident radar signal 2 using the beam port 60 γ in the transmitting Rotman lens 12T and reception of the reflected radar signal 6 using the beam port 60 γ in the receiving Rotman lens 12R i) in the transmitting assembly 10:
  switching device 36T sends electric signal to the beam port 60 γ of transmitting Rotman lens 12T
  after conversion by microwave interconnect device 86, electromagnetic wave is propagated across lens cavity 74
  time-delayed in-phase signals arrive at array ports 62 V, IV, III, II, I in sequence
  time-delayed in-phase signals are converted back to electric signals by microwave interconnect devices 86 and are sent to the transmitting patch antenna assembly 14T
  incident radar signal 2 is transmitted by the transmitting patch antenna assembly 14T in the selected direction 66γ
  incident radar signal 2 bounces off the target vehicle 4 ii) in the receiving assembly 20:
  reflected radar signal 6 is received by the receiving patch antenna assembly 14R from the selected direction 66γ
  reflected radar signal 6 arrives at the array ports 62 I, II, III, IV, V in sequence at the receiving Rotman lens 12R after conversion by the microwave interconnect devices 86, the time-delayed in-phase signals are propagated across the lens cavity 74 to the beam ports 60 of the receiving Rotman lens 12R electromagnetic signal at beam port 60 γ is converted to an electric signal by a microwave interconnect device 86 and outputted to the receiving switching device 36R output signal is directed to the signal processing unit 40 for processing by the receiving switching device 36R

Referring now to FIG. 3B, shows best the construction of the Rotman lens 12 using MEMS technology. FIG. 3B is a cross-sectional view 300 of the Rotman lens 12 seen in FIG. 3A, along cut-line A-A. While conventional Rotman lenses are large, generally measured in the range of inches, the current invention provides a novel design and method of manufacturing which allows for a reduction in the size of a Rotman lens 12 and placed in a small integrated radar package for mass production. In particular, conventional Rotman lenses have been designed to operate in Transverse Electromagnetic Mode (TEM) using microstrip or waveguide technologies. For radar systems operating at 77 GHz, conventional Rotman lenses operating in TEM mode must have a lens gap h in the order of centimeters.

The Rotman lens 12 of the present invention may advantageously be designed to operate in Transverse Electric (TE) mode. More specifically, the Rotman lens 12 is configured to operate in TE10 mode, as the dominant mode of operation. For a radar system 100 operating in the range of 70 GHz to 80 GHz, the Rotman lens 12 may be fabricated on a 500 micrometer thick silicon substrate.

As the Rotman lens 12 is operating in TE10 mode, the lens cavity 74 behaves as a waveguide. Accordingly, the inventor has appreciated that the cut-off frequency of the lens cavity 74 is independent of the vertical dimension, which allows the Rotman lens 12 operating in TE10 mode to reduce the lens gap h. For optimum operation, the lens gap is most preferably selected at less than half of the wavelength ($\lambda/2$) of the operating frequency. Preferably, the lens gap h is much less than $\lambda/2$ when operating in TE10 mode. In a preferred embodiment, with the radar system 100 operating at about 77 GHz, where the wavelength of the incident radar signal 2 is approximately 3.89 millimeters, the height of the lens gap h is preferably about 50 μm or less.

Conventionally, a dielectric such as an aluminum oxide crystal is used within the lens cavity of a conventional Rotman lens to reduce the lens size by altering the paths of propagation through the lens cavity. However, the inventor has discovered that at a reduced size, a solid dielectric material is not necessary. In a most simplified design, in the present Rotman lens 12, air is used to fill the lens cavity 74. The present design furthermore simplifies the construction of the Rotman lens 12 using MEMS technology. Providing a Rotman lens 12 using air as the dielectric material within the lens cavity 74 is operable to reduce the lens gap h significantly to between 10 micrometers and 120 micrometers and preferably between 40 micrometers and 60 micrometers. In other embodiments, however a solid dielectric could still be utilized. Such an approach may allow the size of the Rotman lens 12 to be reduced further.

In a preferred embodiment, the lens gap h may be reduced to about 50 micrometers with the lens cavity having a footprint area of 14.2 mm×11 mm. The exact dimensions of the Rotman lens 12 can be simulated using known simulation software packages. The Rotman lens 12 is manufactured from a conventional silicon base substrate wafer 68 (FIG. 3B). The lens cavity 74 is excavated from the substrate 68 to produce the Rotman lens 12 with a lens gap h of about 50 micrometers or less will also become apparent.

To improve the performance of the Rotman lens 12, the lens cavity 74 may be coated with one or more materials to provide reflectivity and electrical conductivity and to minimize the absorption of the electromagnetic signal within the lens cavity 74. Furthermore, the material may consist of a non-reactive material. For example, a chromium layer 70 and a gold layer 72 may be used. However, it should be understood that other materials are possible, and the use of a chromium layer 70 and gold layer 72 should not be construed as limiting.

TABLE 1

Preferred Parameters of a Rotman Lens

| | |
|---|---|
| Substrate thickness | 100 to 800 μm |
| Lens gap | 5 to 100 μm |
| Lens width | 10 to 20 mm |
| Lens length | 10 to 20 mm |
| Number of beam ports 60 | 3 to 9 |
| Number of array ports 62 | 5 to 30 |
| Focal arc length | 10 to 20 mm |
| Frequency | 15 to 100 (preferably 77 GHz) |
| Wave length | 3 to 20 mm |
| Space between beam ports and array ports | 0.5 to 1.5 mm |
| Characteristic impedance | 50 Ohms± |

Referring now to Table 1, the parameters of an exemplary Rotman lens 12 is listed according to a preferred embodiment. In the exemplary embodiment, the Rotman lens 12 is configured with three beam ports 60 and five array ports 62. More preferably, the Rotman lens 12 is designed with an overall width of about 11 mm, a height of about 1 mm, a length of about 14 to 14.5 mm and a lens gap h less than about 100 The values for the various parameters may be chosen using known formulae for Rotman lenses 12 or by simulation by a computer software package, such as a full-wave solver, MATLAB™, and the like.

The Rotman lens 12 is operable to provide low insertion loss (−2 dB) and high return loss (−20 dB), with a characteristic impedance of 50Ω for easy RF matching.

Figure 4:
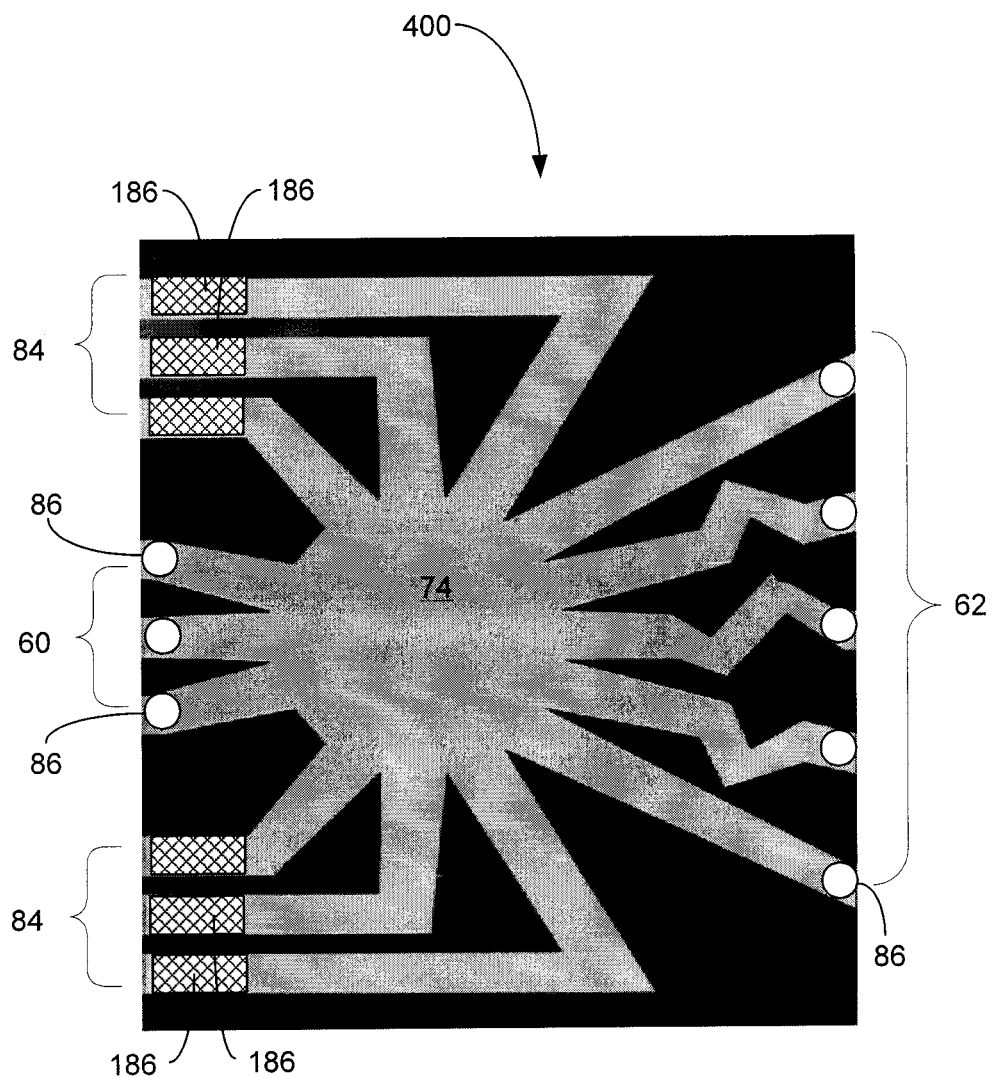
FIG. 4 shows a magnified image of a horizontal section of a Rotman lens constructed using MEMS technology in accordance with an embodiment of the present invention.

FIG. 4 shows an illustration 400 of the Rotman lens 12 according to the parameters listed in Table 1, where the beam ports 60 and array ports 62 are in communication with the lens cavity 74. The G3PO™ Interconnect Series microwave interconnect device 86, are placed in each beam port 60 and each array port 62. Preferably, the Rotman lens 12 is further configured to include one or more pairs of dummy ports 84 to minimize the reflections of the electromagnetic wave propagating through the lens cavity 74 from the sidewalls 80. For example, one pair of dummy ports 84 may deal with the reflections from the array ports 62 and the other pair of dummy ports 84 may deal with the reflections from the beam ports 60. Each pair of dummy ports 84 is configured with an equal number of dummy ports 84 as beam ports 60, and is constructed with similar dimensions as the beam ports 60.

The beam ports 60 and array ports 62 are configured to match in transmission length for consistent beam forming and transmission. The pairs of dummy ports 84 are operable to guide reflections out of the chamber into absorbent material 86. Thus, the pairs of dummy ports 84 may be longer or shorter than the beam ports 60 and array ports 62 based on space and geometry of the Rotman lens 12. The cross-section of the dummy ports 84 most preferably matches both the cross-sections of both the beam ports 60 and array ports 62.

Although not essential, microwave interconnect devices 86 are also shown in each of the beam ports 60 and array ports 62. Each microwave interconnect device 86 is operable to convert an electrical signal to an electromagnetic signal or an electromagnetic to an electrical signal. Thus when acting as part of the generating/transmitting system 200, the microwave interconnect devices 86 in the beam ports 60 of the transmitting Rotman lens 12T convert the received input signal 31 into an electromagnetic wave and the microwave interconnect devices 86 in the array ports 62 convert the time-delayed in-phase signals from electromagnetic signals to electrical signals. When acting as part of the receiving/processing system 250, the microwave interconnect devices 86 in the array ports 62 of the receiving Rotman lens 12R convert the received time-delayed, in-phase signals into electromagnetic waves and the microwave interconnect devices 86 in the each of the beam ports 60 convert the received electromagnetic wave to an electrical signal.

Figure 5:
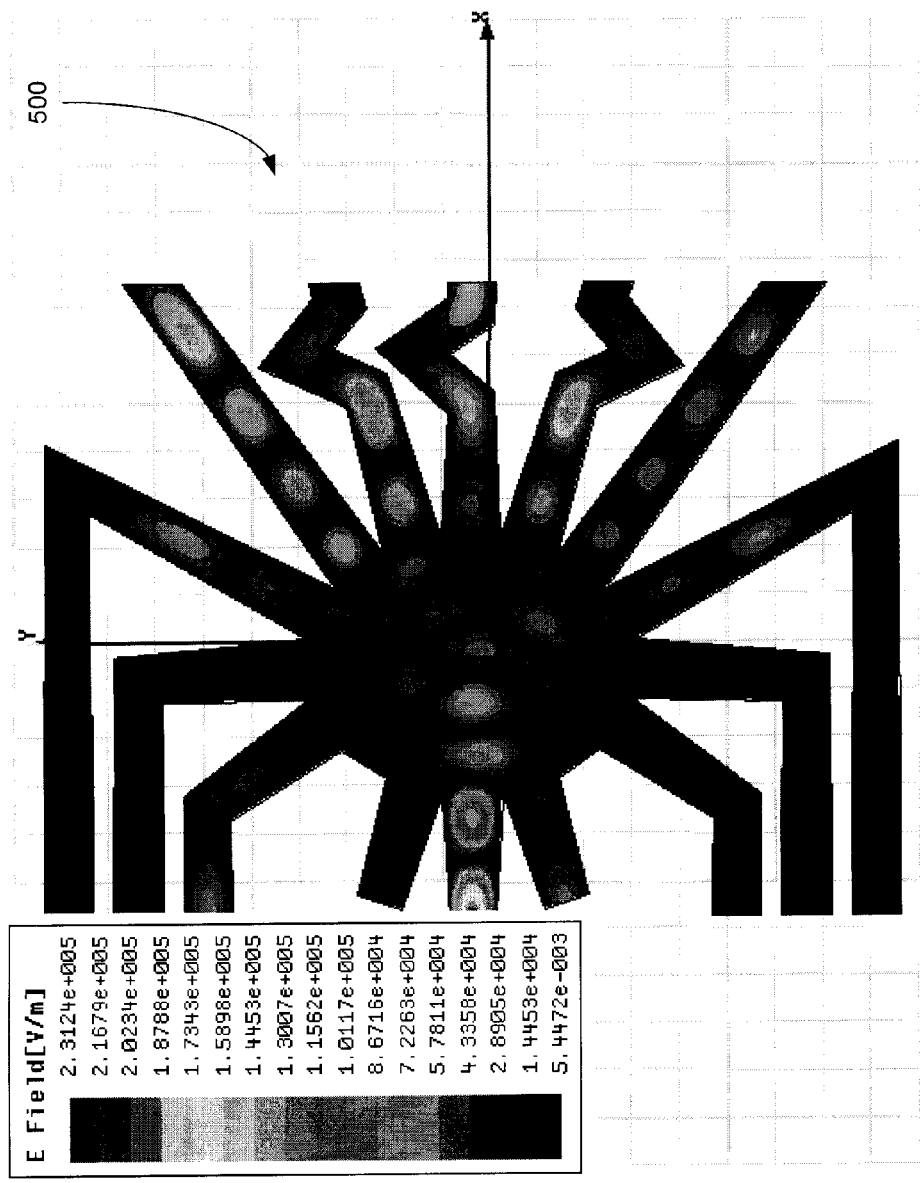
FIG. 5 shows a simulated pattern of electromagnetic waveforms through a Rotman lens in accordance with an embodiment of the present invention.
Figure 6:
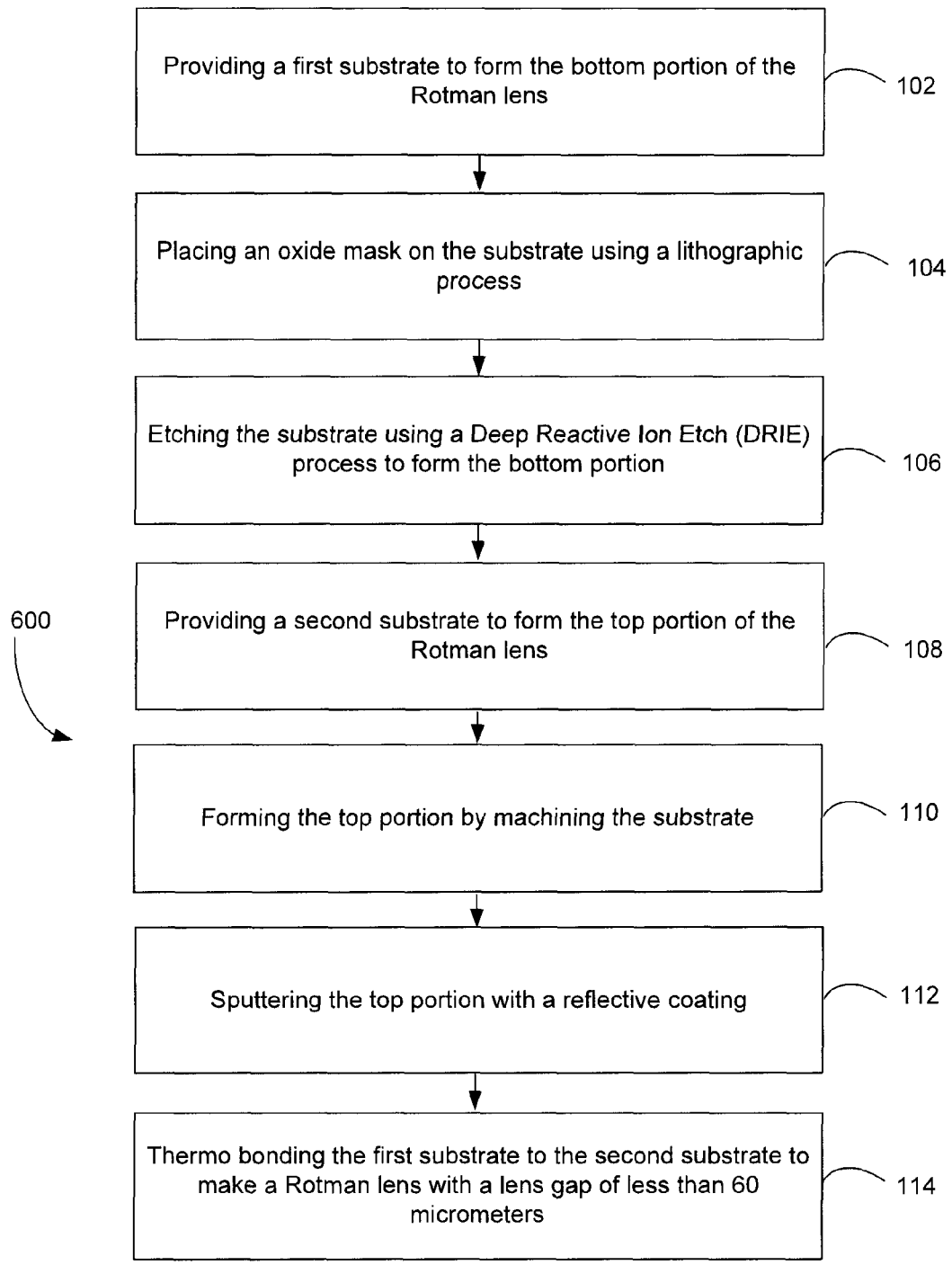
FIG. 6 shows a flow chart for a method of manufacturing a Rotman lens in accordance with an embodiment of the present invention.

Referring now to FIG. 5, the illustration 500 shows the electric field patterns of the exemplary Rotman lens 12 illustrated in FIG. 4, with the parameters listed in Table 1. FIG. 5 illustrates the distribution of field strength throughout the lens cavity 74, including in both pairs of dummy ports 84, the beam ports 60 and the array ports 62.

Turning now to FIG. 6 and FIG. 7A to FIG. 7C, a preferred method of manufacturing the Rotman lens 12 is described in accordance with a preferred embodiment of the present invention. As seen in the flow chart 600, a substrate 68 is provided to form the bottom portion 700 of the Rotman lens 12. The substrate 68 may be formed of a semiconductor and may take the form of a wafer to incorporate known techniques for creating integrated circuits and mass production. The substrate 68 may begin as a wafer of any semiconductor material, and may be formed of silicon (Si), gallium arsenide (GaAs), germanium (Ge), and the like for easy manufacturing, Furthermore, the wafer may be different thicknesses (such as a 635 micrometer thick silicon wafer).

The substrate 68 may undergo cleaning prior to being formed into the lens cavity 74. For example, a standard set of wafer cleaning steps, such as the removal of organic contaminants, thin oxide layers and ionic contaminants (i.e. an RCA clean) may be performed. Next, (see BLOCK 104), the substrate 68 is then shaped into the lens bottom portion 700 (FIG. 7A) of the Rotman lens 12 by placing an oxide mask on the substrate 68 using a lithographic process. In some processes, an oxide mask of silicon dioxide may be used.

Next, the substrate 68 is etched (see FIG. 6 BLOCK 106) to form the lens cavity 74, using Deep Reactive Ion Etching (DRIE). DRIE is used to create steep walls in the lens cavity 74. It was a process developed specifically for MEMS applications to create an approximately vertical (90°) sidewall 80. The steep walls form the sidewalls 80 of the Rotman lens 12. A lens bottom portion 700 etched using DRIE is shown best in FIG. 7A.

In a preferred embodiment, a silicon wafer is etched to a depth of 60 µm using a DRIE process by the Alcatel 601E Deep Silicon Etch (trade-marked) machine. The patterns are defined by a thin layer of silicon oxide which is patterned lithographically prior to etching. Silicon is etched selectively relative to the oxide mask. The system is optimized for high etch rate and high aspect ratio etching of silicon.

A Bosch process of DRIE may be used incorporating vertical anisotropic deep plasma etching. The sidewalls 80 may be protected by depositing an ultra-thin layer of silicon-dioxide in the lens cavity 74. Next, an electron beam evaporation method may be used to deposit a 100 nm gold seed layer (not shown) using a 40 nm thick chromium adhesion layer 70 using Intivac's Nanochrome™ Deposition System. Next, a 3 µm thick gold layer 72 is deposited using an electroplating method. Other methods for depositing the gold layer 72 may however be used, such as sputtering or vacuum metalizing. Sputtering involves ejecting a coating material onto the substrate from a source material, which is then deposited onto the substrate 68 at high energies. Other materials may also be used. For example, platinum or other non-reactive materials may be deposited on the bottom portion 700. Alternatively, other conductive metals such as silver, copper, chrome and the like may be used.

Figures 7A, 7B:
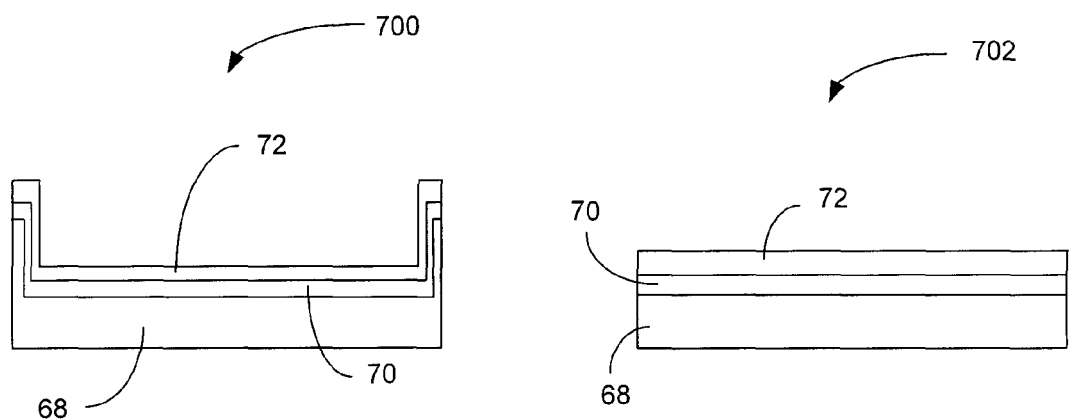
FIG. 7A shows the step of Sputter coating a bottom portion of a Rotman lens in accordance with a method of manufacturing.
FIG. 7B shows the step of Sputter coating a top portion of a Rotman lens in accordance with a method of manufacturing.
Figure 7C:
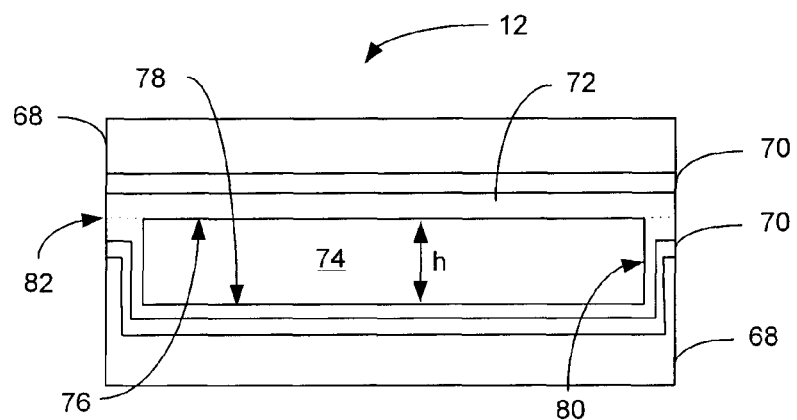
FIG. 7C shows the step of thermocompression bonding the top portion to the bottom portion of the Rotman lens in accordance with a method of manufacturing.

A lens top portion 702 is shown in FIG. 7B, is formed using another substrate (BLOCK 108) to form the top 76 of the Rotman lens 12. The top portion 702 may be machined to form the proper shape in BLOCK 110. In one embodiment, the lens top portion 702 and lens bottom portion 700 of the Rotman lens 12 may be formed on the same wafer (substrate 68). In BLOCK 112, the top portion 702 is preferably metalized in the same fashion as the bottom portion 700 by placing a chromium adhesion layer 70 and gold layer 72. In an alternate embodiment, an electron beam evaporation method may be used to deposit a gold layer 72 on top of the chromium adhesion layer 70.

Finally, the lens top portion 702 of the Rotman lens 12 and the DRIE etched lens bottom portion 700 of the Rotman lens 12 are bonded together to form the Rotman lens 12 in (see BLOCK 114), using a thermo-compression bonding technique. The lens top portion 702 and lens bottom portion 700 of the Rotman lens 12 are sandwiched together under high heat and compression until they form a solid lens cavity 74. Thermocompression bonding further enables the lens gap h to be formed with a high degree of precision. The lens top portion 702 and lens bottom portion 700 may be pressed together to form a lens gap h much less than a half wavelength ($\lambda/2$). As discussed, the lens gap h may be between 20 µm and 100 µm, and preferably between 40 µm and 60 µm. In a preferred embodiment, the lens gap may be about 50 µm.

In an alternate possible mode of assembly, the sidewall 80 may be connected to the top portion 702 using a conductive epoxy technique to complete the fabrication of the Rotman lens 12.

After bonding the top 76 and the bottom 78 to form the lens cavity 74, each dummy port in the pairs of dummy ports 84 is terminated using a high viscosity absorber liquid 186. The absorber liquid 186 may be dispensed into the dummy ports 84 using a microdispenser. Most preferably, the absorber liquid is operable to realize an attenuation of −20 dB of the normally incident signal when inserted into the pairs of dummy ports 84.

Figure 8:
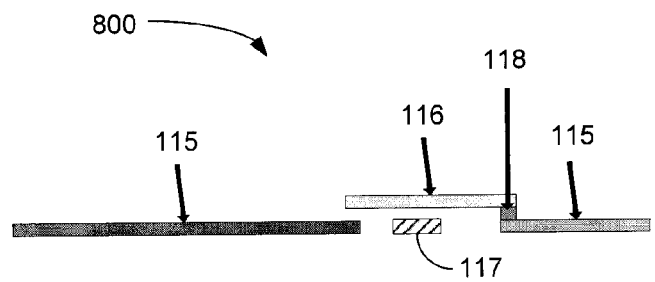
FIG. 8 shows a functional schematic of a single-throw, single-pole switch implemented in MEMS technology.
Figure 9:
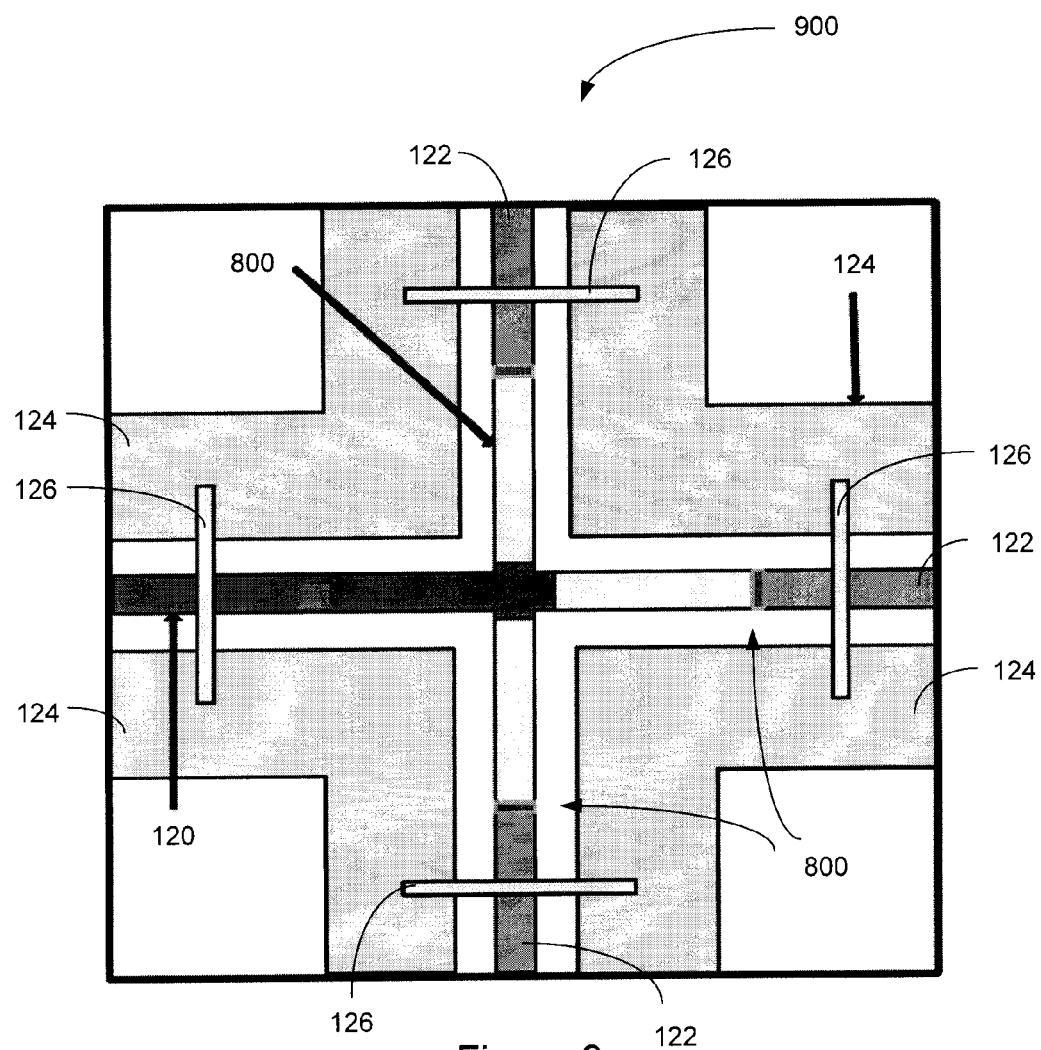
FIG. 9 shows a single-pole, triple-throw switch (SP3T) implemented in MEMS technology in accordance with an embodiment of the present invention.

Returning briefly to FIG. 1, the switching device 36T in communication with the transmitting assembly 10 is operable to direct the input signal 31 from the signal generator 32 into a single beam port α, β, γ of the plurality of beam ports 60 of the Rotman lens 12 when part of the generating/transmitting system 200. Similarly, the switching device 36R is operable to direct the signal from one of the three beam ports 60 of the Rotman lens 12 to the signal processing unit 40 when the switching device is part of the receiving/processing system 250. As shown in FIG. 8 and FIG. 9, in a preferred embodiment, the switching device 36 incorporates a MEMS-based single-pull-triple-throw switch 900 constructed using MEMS-based technology on an integrated circuit (not shown) using co-planar waveguides (CPW). The MEMS-based single-pull-triple-throw (SP3T) switch 900 at RF frequencies may be constructed using three MEMS-based single-pole-single-throw (SPST) switches 800.

The conceptual geometry of a MEMS-based single-pole-single-throw (SPST) switch at RF frequencies (SPST switch 800) is shown in FIG. 8. The SPST switch 800 is constructed using CPW lines 115 and a cantilever 116 connected to one side of the SPST switch 800 by an anchor 118. A conductive pad 117 is located underneath the cantilever 116. Upon activation by a DC bias voltage, the conductive pad 117 creates an electrostatic force that causes the cantilever 116 to collapse on the CPW lines 115; thereby establishing the connection between the CPW lines 115.

Referring now to FIG. 9, the MEMS-based single-pull-triple-throw switch at RF frequencies (SP3T switch 900) incorporates three SPST switches 800. The SP3T switch 900 is configured in a cross pattern with a single switch input 120 leading to three switch outputs 122. Each of the switch outputs 122 leads to a different beam port α, β, γ of the Rotman lens 12. The control unit 36 directs the signal received at the switch input 120 to the appropriate switch output (of switch outputs 122) by biasing the appropriate SPST switch 800 in the SP3T switch 900.

As can be seen in FIG. 9, the SP3T switch 900 is configured with a number of discontinuous ground planes 124. The ground planes 124 are connected to each other and to a common ground by bridges 126. Proper grounding of the SP3T switch 900 may improve the performance of the SP3T switch 900 by increasing the isolation between each of the SPST switches 800.

It is to be appreciated that when a Rotman lens 12 has more beam ports 60 than can be uniquely supplied by the outputs 122 of a single SP3T switch 900 (i.e. when there are more than three beam ports 60), a higher order single-pole multi-throw switch may be used (not shown). Alternatively, any number of SP3T switches 900 may be connected in a tree structure, or any other manner, to uniquely supply an indefinite number of beam ports 60. The control unit 30 may incorporate additional control signals in such a system to uniquely communicate the input signal 31 received from the signal generator 32 to each of the beam ports 60.

When the switching device 36R is operating as part of the receiving/processing system 250, the switching device 36R may operate in a similar fashion as the switching device 36 described above. However, when operating in the receiving/processing system 250, the direction of the signal is reversed. The three switch outputs 122 become inputs and the switch input 120 becomes the single output. When operating in the receiving/processing system 250, the switching device 36R is thus operable to receive signals from each of the beam ports 60 and communicate one of the signals to the processing unit 40.

As discussed previously, the selected direction 66 of the incident radar signal 2 and reflected radar signal 6 (i.e. the direction of propagation/reception) is dependent on the combination of the Rotman lens 12 and the patch antenna assembly 14. The inventor has appreciated that a properly designed patch antenna assembly 14 can provide additional utility in the operation of the radar system 100 by enabling the radar system 100 to operate in multiple modes.

As known in the art, microstrip technology is well known in RF design. A microstrip is a transmission line which comprises a strip or patch of a conductor separated from a ground plane by a dielectric or substrate. Common microwave components are commonly built using microstrip technology, such as antennas, couplers, filters and the like.

Referring now to FIG. 10A and FIG. 10B, each patch antenna assembly 14 is comprised of a plurality of antenna arrays 130. Each antenna array 130 is connected to one of the array ports 62. In the case of the transmitting antenna assembly 14, each of the antenna arrays 130 is operable to receive one of the time-delayed, in-phase signals from one of the array ports 62 and, collectively, transmit the incident radar signal 2 in a selected direction 66 towards a target vehicle 4.

Each antenna array 130 is configured as a linear series of microstrip patches 132. In a preferred embodiment, each assembly 14 seen in FIG. 10A has five antenna arrays 130, each with 12 microstrip patches 132. Each of the antenna arrays 130 is connected to a corresponding array port 62 of the Rotman lens 12 at the microstrip input 134 of the first microstrip patch 132 in the antenna array 130. While the number of antenna arrays 130 is matched to the number of array ports 62 in the corresponding Rotman lens 12, it should be understood that any number of microstrip patches 132 can be used in each antenna array 130. Furthermore, the microstrip patches 132 in the antenna array 130 are spaced a wavelength ($\lambda_g$) apart to ensure proper isolation between the transmitted signals.

As seen in FIG. 10B, each microstrip patch 132 is a strip of conductor separated from a ground plane by a suitable substrate (not shown). To improve the performance of the antenna array, the width 138 and length 136 of the microstrip patch 132 is designed to be $\lambda_g/2$ (wherein $\lambda_g$=modified wave length). The microstrip patches are further designed to include an inset 140 on either side of the microstrip input 134. The inset 140 is designed to have an inset width 142 and an inset depth 144, which reduces noise during transmission and reception from known edge effects by directing the transmission power to the center of the microstrip patch 132. Parameters for an exemplary patch antenna assembly 14 are described in Table 2. Where appropriate, common design parameters were used and then adjusted through simulation.

TABLE 2

Preferred Patch antenna assembly Parameters

| Parameter | Value |
| --- | --- |
| Substrate thickness | 100 to 130 µm |
| Array length | 28 to 35 mm |
| Array width | 10 to 14 mm |
| Number of sub arrays | 5 to 30 |
| Number of patches in every array | 4 to 36 |
| Frequency | 15 to 100 GHz (preferably 77 GHz) |
| Wave length | 3 to 20 mm |
| Space between elements | $\lambda_g$ |
| Patch dimensions | $\lambda_g/2$ |
| Inset depth | 200 nm |
| Inset gap | 9 nm |
| Gain | 18.3 dB |
| Beam width | 40° to 4° |

In a preferred embodiment, the patch antenna assembly 14 is fabricated on a single substrate, for example, a 125 micrometer thick RT/Duroid® 5880 substrate or a micromachined silicon substrate with a DRIE etched cavity at the bottom to realize a synthetic permittivity resulting in improved efficiency and gain. After cleaning the substrate using a standard RCA cleaning process, the substrate is electroplated on both the bottom and the top with a conductor, such as gold and the like. The top side conductor is then patterned with an antenna mask and etched using common microstrip etching techniques to construct the antenna assembly 14.

The inventor has appreciated that the selected direction 66 of the incident radar signal 2 or the reflected radar signal 6 in either the transmitting assembly 10 or the receiving assembly 20, respectively, is correlated to two controllable factors. The first factor is which of the beam ports 60 (i.e. beam port α, β, γ) is selected by the associated switching device 36. The second factor is the number of microstrip patches 132 operable in each of the antenna arrays 130. Accordingly, while the number of beam ports 60 in the Rotman lens 12 is limited by the physical parameters of the lens cavity 74, the inventor has appreciated that the number of microstrip patches 132 in each antenna array 130 is easily controlled. By modifying the number of microstrip patches 132 in each antenna array 130, the selected direction 66 of the radar system 100 can be refined.

Figure 11:
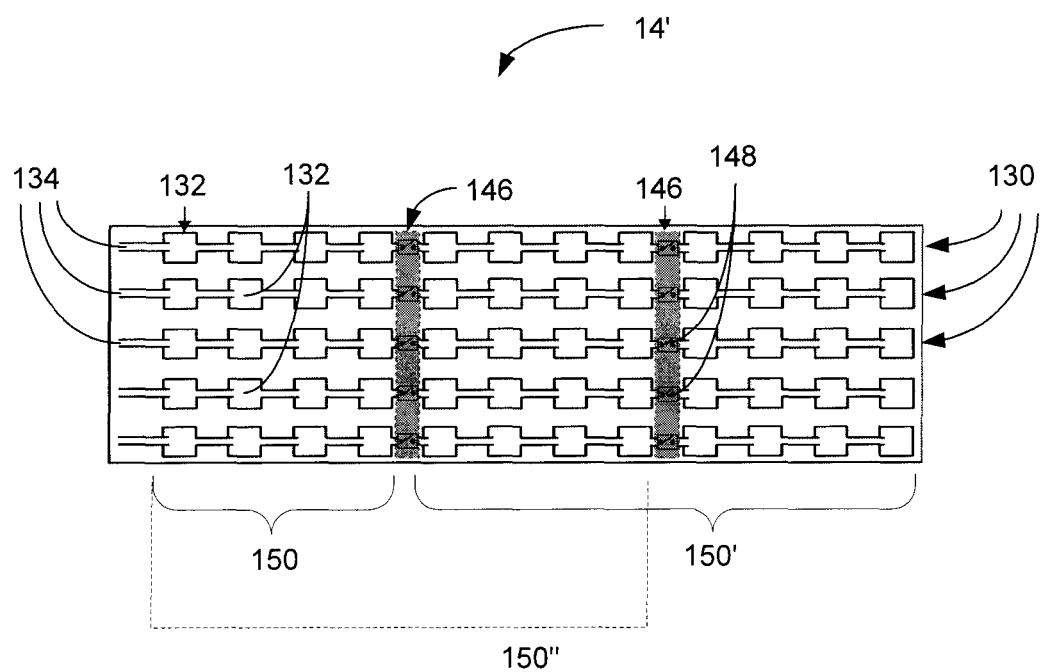
FIG. 11 shows a patch antenna assembly operable in multiple modes incorporating an array of RF switches in accordance with an embodiment of the present invention.

An alternative patch antenna assembly 14' is shown in FIG. 11 in accordance with a further embodiment of the present invention, and wherein like reference numerals are used to identify like components. While the patch antenna assembly 14' includes the same antenna arrays 130 of the patch antenna assembly 14 seen in FIG. 10A, the patch antenna assembly 14' of FIG. 11 further includes one or more switch arrays at radio frequencies (RF switch array 146).

Each RF switch array 146 is configured to include an RF switch 148 for each of the antenna arrays 130. For example, the RF switch array 146 may be configured to include an array of MEMS-based single-pole single-throw (SPST) switches in a preferred embodiment. Each RF switch 148 is inserted between two microstrip patches 132 in each antenna array 130. When the RF switch array 146 is inserted into the patch antenna assembly 14', each of the antenna arrays 130 is segmented into two microstrip segments 150, where a microstrip segment 150 is located on either side of the RF switch array 146. Effectively, each RF switch 148 is coupled between two microstrip segments 150, 150', 150", and the like.

When an RF switch array 146 is enabled by the control unit 30, each of the RF switches 148 in the RF switch array 146 is operable to connect the two microstrip segments 150, 150', 150" on either side of the RF switch array 146 resulting in an antenna array 130 with an increased number of microstrip patches 132. When the RF switch array 146 is disabled, each of the RF switches 148 is operable to disconnect the two microstrip segments 150, 150', 150" on either side of the RF switch array 146. Thus, the control unit 30 is able to shorten or lengthen the number of microstrip patches 132 operating in the patch antenna assembly 14. By controlling the length of each antenna array 130, the selected direction 66 can be adjusted.

More than one RF switch array 146 may be utilized by the patch antenna assembly 14. In the preferred embodiment of FIG. 11, the patch antenna assembly 14' incorporates two RF switch arrays 146. The patch antenna assembly 14' is operable in multiple modes (or multimodal mode). When activated by the control unit 30, the switch arrays 146 labeled 'SW1' and 'SW2' reconfigure the patch antenna assembly 14 to switch from short-range to mid-range to long-range functionality. When both of the RF switch arrays 146 are in the OPEN position, four microstrip patches 132 per antenna array 130 will provide short range coverage. When the RF switch array 146 'SW 1' is CLOSED and 'SW 2' is OPEN, eight microstrip patches 132 per antenna array 130 will provide mid-range range coverage. Finally, when both the RF switch arrays 146 'SW 1' and 'SW 2' are CLOSED, 12 microstrip patches 132 per antenna array 130 will be operable to provide long range coverage. All other performance parameters of the reconfigurable patch antenna assembly 14' in FIG. 11 remain similar to the parameters of the single modal patch antenna assembly 14, seen in FIG. 10A.

The operation of a preferred embodiment of the radar system 100 is described operating in multimodal mode With reference to FIGS. 1 and 12. The control unit 30 is activated to synchronize the operation of the radar system 100 by sending control signals to the various components at the appropriate time. The signal generator 32 begins the process of transmitting an incident radar signal 2 by producing an input signal 31 for the transmitting assembly 10. The input signal 31 is then directed to a specific beam port 60 α, β, γ of the transmitting Rotman lens 12T by a switching device 36T, as an electric signal. Before entering the transmitting Rotman lens 12T, the electric signal is converted to an electromagnetic wave by the microwave interconnect device 86 in each beam port 60. The electromagnetic wave is then propagated across the cavity lens 74 of the transmitting Rotman lens 12T and is converted to electrical signals by the other associated microwave interconnect device 86, exiting the transmitting Rotman lens 12T at the array ports 62, as time-delayed, in-phase electrical signals. The signals are then communicated to the patch antenna assembly 14 electrically where they are transmitted electromagnetically as the incident radar signal 2. The patch antenna assembly 14T is configured with one or more RF switch arrays 146 to segment the patch antenna assembly 14T into two or more segments 150. Enabling and/or disabling the different RF switch arrays 146 in sequential combinations effectively changes the number of connected microstrip patches 132 in each antenna array 130. This allows the control unit 30 to determine a selected direction 66 for the incident radar signal 2.

The reflected radar signal 6 which is returned following incidence with a target vehicle 4 is received by the antenna array 14R. Thereafter, the signal 6 follows a similar transmission path in reverse leading to the signal processing unit 40. The incident radar signal 2 and reflected radar signal 6 are then compared to determine the location and/or velocity of any target vehicle 4 in the path of the radar system 100.

As discussed, the selected direction 66 of the incident radar signal 2 and reflected radar signal 6 is dependent on the specific beam port α, β, γ of beam ports 60 utilized in each Rotman lens 12 and the number of microstrip patches 132 enabled in each antenna array 130 in the associated patch antenna assembly 14. The control unit 30 determines which beam port 60 α, β, γ of the Rotman lens 12T is utilized by sending control signals to both the switching device 36 and to the patch antenna assembly 14T to determine how many microstrip patches 132 are enabled by sending control signals to the RF switch arrays 146. By cycling through the different combinations of beam ports 60 and RF switch arrays, the radar system 100 can identify targets in a wide field of view (FOV).

Referring now to FIG. 12, a highway illustration 1200 of the operation of the radar system 100 is illustrated in an installation 8, for example host vehicle 8, in accordance with an embodiment of the present invention. The radar system 100 may be installed in the bumper assembly of the host vehicle 8, and preferably in a central location. The radar system 100 may also be installed on the hood, rear bumper or any other location of the host vehicle 8 in a generally outward facing direction such that the transmitting assembly 10 and receiving assembly 20 are operable to transmit and receive the incident radar signal 2 and reflected radar signal 6. For example, the radar system 100 may be installed on the front, rear or side faces of the host vehicle 8 or on or in the front or rear grill.

While navigating a route, for example a highway, the radar system 100 is operable to identify a number of target vehicles 4 in the vehicle's FOV. The radar system 100 is operable to detect objects at different distance ranges and at different angles relative to the host vehicle by cycling through the different parameters of beam port α, β, γ and combinations of RF switch arrays 146.

Table 3: Performance Specifications lists the different performance specifications of a radar system 100 in a preferred embodiment for the highway illustration in FIG. 12:

TABLE 3

Performance Specifications

| Parameter | Value |
| --- | --- |
| Maximum distance | 200 m |
| Minimum distance | 0.5 m |
| Range resolution | 0.55 m |
| Average range measurement accuracy | 98.64% |
| Maximum relative velocity | ±400 km/h |
| Minimum relative velocity | 0 km/h |
| Velocity resolution | 0.5 km/h |
| Average velocity measurement accuracy | 97.96% |
| Refresh rate | 6.81 ms–40 ms |
| Maximum target count | 8 targets per beam |

The beam ports 60 α, β, γ are each associated with selected direction of propagation. For example, the specific beam port β, is associated with a direction of propagation square (i.e. 0°) to the patch antenna assembly 14T. Similarly, the specific beam ports 60 α and γ are associated with the angle θ and –θ, respectively. The combination of specific beam port α, β, γ and enabled switches SW1 and SW2 146, 146' may determine the selected direction 66 for an incident radar signal 2 and a reflected radar signal 6. By selecting different combinations of RF switch arrays 146 may allow the radar system 100 to operate in multiple modes (or multimodal mode), such as Short Radar Range (SRR) mode, Medium Radar Range (MRR) mode and Long Radar Range (LRR) mode. The effect on the selected direction 66 for different combinations of beam ports 60 and enabled RF switch arrays 146 is listed in Table 4: Angle of Selected Direction in Multimodal Mode. It should be understood that radar system 100 may be configured to operate with different angles in alternative embodiments by carefully selecting the number of microstrip patches 132 operable in each antenna array 130 and the placement and configuration of the beam ports 60 in the Rotman lens 12R. Furthermore, if additional RF switch arrays 146 or beam ports 60 are used, additional ranges may be created for the radar system 100. The recited angles should not be construed as limiting as other configurations are possible. For example, wider angles may be chosen for the MRR and LRR modes, such as 25° for the MRR mode and 10° for the LRR mode, and the like.

TABLE 4

Angle of Selected Direction in Multimodal Mode

| Mode | Switches | Operable microstrip patches | Beam port A | β | γ |
| --- | --- | --- | --- | --- | --- |
| SRR | 'SW1' = OPEN, 'SW2' = OPEN | 4 | 40° | 0° | –40° |
| MRR | 'SW1' = CLOSED, 'SW2' = OPEN | 8 | 10° | 0° | –10° |
| LRR | 'SW1' = CLOSED, 'SW2' = CLOSED | 12 | 2° | 0° | –2° |

Referring now to FIG. 13A, FIG. 13B and FIG. 13C, the operation of the radar system 100 is illustrated as three different scanning ranges 1300, 1302, 1304 in three different modes of operation according to a preferred embodiment. In SRR mode, as illustrated in FIG. 13A when 'SW1' (146)=OPEN and SW2' (146')=OPEN, the radar system 100 in the host vehicle 8 incorporates a wide angle θ, to detect target vehicles 4 that are relatively close to the vehicle 8. For example, the SRR mode may be configured to detect target vehicles 4 within an 80° FOV that are between 0 m and 20 m from the vehicle 8. This may be useful when parking or for detecting vehicles that are in close proximity to the vehicle 8.

Furthermore, high resolution in the SRR mode may be useful for autonomous or semi-autonomous driving. In situations where a vehicle's navigation system may need to intervene to negate or avoid an accident, an SRR mode operable to display a high degree of precision and accuracy may be incorporated into the decision making process of collision avoidance systems.

In MRR mode, when 'SW1' (146)=CLOSED and 'SW2' (146')=OPEN, the radar system 100 is operable to detect target vehicles 4 in a middle distance range. For example, in the embodiment illustrated in FIG. 13B, the MRR mode is designed to detect target vehicles 4 between 0 m and 80 m in front of the vehicle HOST. This range may be useful for detecting vehicles or target vehicles 4 during normal city driving conditions. Furthermore, it is operable to detect target vehicles 4 that are outside the range of the SRR mode.

Finally, the LRR mode, when 'SW1' (146)=CLOSED and 'SW2' (146')=CLOSED, may be designed for highway driving, as illustrated in FIG. 13C. The LRR mode allows the host vehicle 8 to detect target vehicles 4 at ranges from 0 m to 300 m and preferably 80 m to 150 m. Furthermore, the LRR mode may be used to detect target vehicles 4 up to 200 m and further. To detect target vehicles 4 at such a range, the inventor has appreciated that the radar system 100 may be required to direct the incident radar signal 2 or receive the reflected radar signal 6 with a high degree of accuracy. For example, to detect a target vehicle 4 accurately at a distance of 150 m, the difference in angle between the selected direction 66$_α$ for specific beam port α and selected direction 66$_β$ for the specific beam port β is only 2°. Accordingly, a radar system 100 incorporating a Rotman lens 12 in the transmitting assembly 10 and a configurable patch antenna assembly 14 incorporating one or more RF switch arrays 146 is operable to provide such resolution.

To improve the performance of the radar system, and importantly to reduce the refresh rate, bandwidth chirping may also be utilized to help associate the reflected radar signals 6 with a specific incident radar signal 2. Bandwidth chirping is a spread spectrum technique that uses frequency modulation to encode information. Bandwidth chirping utilizes a sinusoidal signal whose frequency varies linearly, thus providing a radar signal or pulse to be longer and accordingly, more energetic. An additional benefit of this approach is that bandwidth chirping is resistant to the Doppler Effect. In a preferred embodiment, the signal generator 32 is operable to generate the input signal 31 for the transmitting assembly 10 incorporating bandwidth chirping. The control unit 30 further generates a reference signal 33, for example by the phase lock loop module 34. The reference signal 33 is used to modulate a voltage controlled oscillator (VCO) or signal generator 32, which generates a linear frequency modulated continuous wave signal (LFMCW) having a frequency sweep range centered at 77 GHz. In one embodiment, the sweep range may be between –2 GHz and 2 GHz and preferably between –1 GHz and 1 GHz.

As described with respect to FIG. 12 and FIG. 13, of the radar system 100 is preferably operable in multimodal mode, for example, using three basic modes: LRR for long range distances (i.e. 80 m to 150 m), MRR for mid-range distances (i.e. 20 m to 80 m), and SRR for short range distances (i.e. 0 m to 20 m). The control unit 30 operates to implement an algorithm to control the radar system 100 to switch constantly from one mode to another with a specified time constant to scan the near field and the far field regions. For example, the control unit 30 may operate the radar system 100 to first set the beam port 60 to one of the specific beam ports 60 α, β, γ. Next, the radar system 100 is operable to sequentially scan the three modes: SRR, MRR and LRR by changing the number of microstrip patches 132 in each patch antenna assembly 130, as for example, shown in Table 4. The control unit 30 may then switch the beam port 60 to the next beam port and sequentially scan the three modes again according to the next specific beam port α, β, γ. This cycle may loop for each of the beam ports 60 in the Rotman lens 12. Furthermore, the pattern may repeat indefinitely.

In an alternate embodiment, the control unit 30 may be operable to first set a particular mode (i.e. SRR, MRR, LRR), and then scan each specific beam port α, β, γ before moving on to the next mode. Other patterns are possible for cycling through all the different possible combinations of beam ports 60 and modes for any number of beam ports 60 and modes (e.g. SRR, MRR, LRR, etc.)

The control unit 30 is further operable to coordinate the input signal 31 to utilize bandwidth chirping in combination with the different multimodal modes. The input signal 31 may be synchronized to the timing of the switching devices 36 and RF switch arrays 146, to send specific bandwidth chirping patterns (or chirps) for incident radar signals 2 sent in SRR mode, MRR mode and LRR mode. For example, the control unit 30 may be operable to conduct a 2 ms sweep for each beam port (i.e. 1 ms for up chirp, 1 ms for down chirp) for each mode. Further, the control unit 30 may send chirps of different patterns when operating in different modes (i.e. when in SRR mode, MRR mode and LRR mode).

Figure 14A:
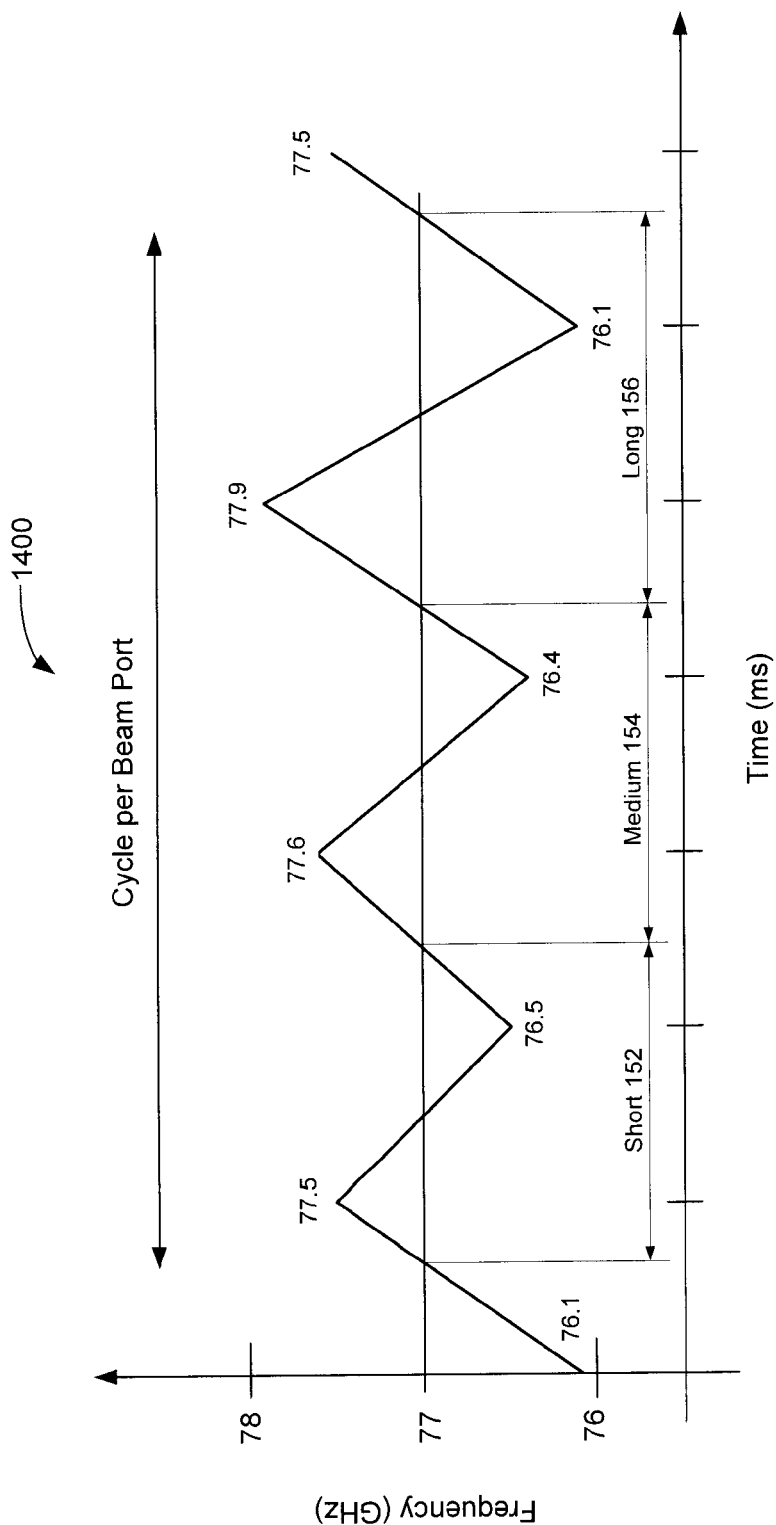
FIG. 14A shows a frequency pattern of an input signal for a radar system operating in multiple mode utilizing bandwidth chirping in accordance with an embodiment of the present invention.

Referring now to FIG. 14A, a frequency waveform 1400 incorporating bandwidth chirping is illustrated. The frequency waveform 1400 illustrates the repeating LFMCW signal which may be used as the input signal 31 to the radar system 100 according to a preferred embodiment. A specific pattern of up chirp/down chirp/up chirp (e.g., 0.5 ms up chirp, 1 ms down chirp, 0.5 ms up chirp) may be associated with a particular mode or specific beam port α, β, γ of the radar system 100. The varied bandwidths seen in the frequency waveform 1400 for each mode (e.g. SRR, MRR and LRR) is operable to ensure that the intermediate frequencies of all the reflected radar signals 6 can be sampled using the same ADC 46, such as for example, an ADC operating at 500 kilo-samples/sec.

The frequency waveform 1400 seen in FIG. 14A will be repeated for each specific beam port α, β, γ before switching to the next specific beam port β, γ, α. The short period 152 will be sent out when the radar system 100 is operating in SRR mode, the medium period 154 will be sent out when the radar system 100 is operating in MRR mode and the long period 156 will be sent out when the radar system 100 is operating in LRR mode. The radar system 100 is then operable to switch the specific beam port α, β, γ receiving the input signal 31 and the cycle for the SRR period 152, the MRR period 154 and LRR period 156 is operable to repeat. The frequency waveform 1400 may be repeated indefinitely for each of the beam ports α, β, γ in the plurality of beam ports 60.

Referring to FIG. 14A, the SRR mode is operable to utilize a chirp bandwidth of approximately 1 GHz in a preferred embodiment, where during the SRR mode 4 microstrip patches 132 are operable in the radar system 100. As targets detected in the SRR mode are closest to the host vehicle 8, the power requirements for the SRR mode are minimized.

The MRR mode is operable to utilize a chirp bandwidth of about 1.2 GHz. Eight microstrip patches 132 are operable in the radar system 100 in MRR mode, which provides high directivity.

The LRR mode is operable to utilize a chirp bandwidth of approximately 2 GHz. The large chirp bandwidth is required to get significant intermediate frequencies for target vehicles 4 at full distance. The inventor has appreciated that using higher frequencies as the input signal 31 allows the radar system 100 to transmit the incident radar signal 2 at higher power. A stronger incident radar signal 2 will result in a stronger reflected radar signal 6 (i.e. increased signal strength) when reflected from the target vehicle 4. Furthermore, the full patch antenna assembly 14' is utilized with all 12 microstrip patches 132 in operation, which provides maximum directivity and a small scan angle.

Figure 14B:
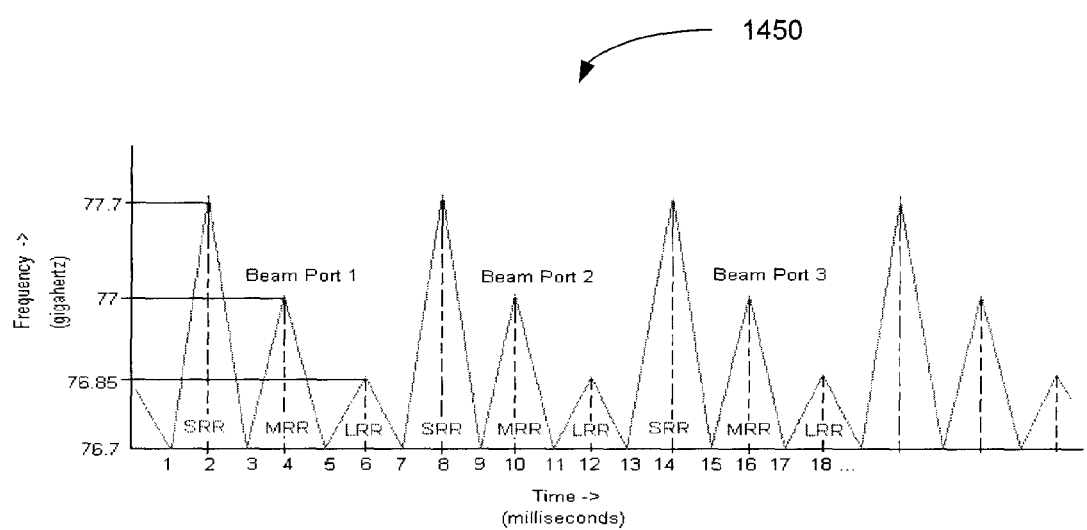
FIG. 14B shows an alternate frequency pattern of an input signal for a radar system operating in multiple modes utilizing bandwidth chirping.

It should be understood the radar system 100 may incorporate different input signals 31, utilizing different variations of the frequency waveform 1400, in different embodiments of the invention. The exemplary waveform 1400 should not be construed as limiting. For example, an alternate frequency waveform 1450 is shown in FIG. 14B.

Figure 15A:
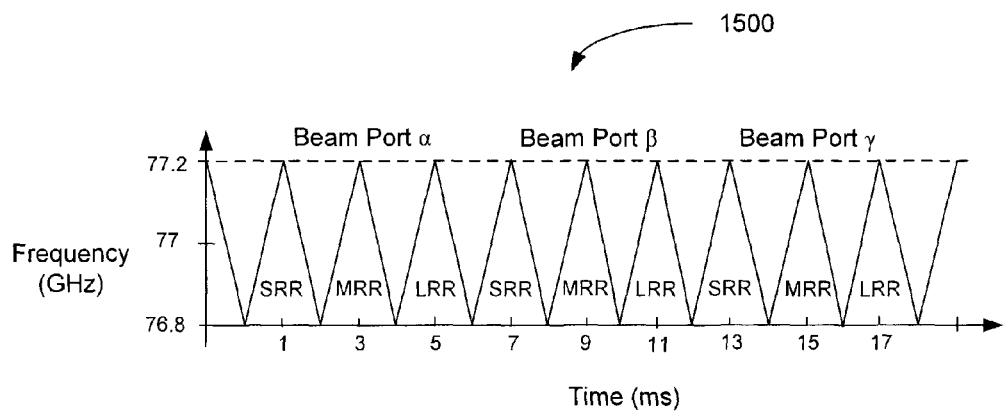
FIG. 15A shows a frequency pattern of an input signal for a radar system utilizing a modulated chirp bandwidth signal in accordance with an alternate embodiment of the present invention.
Figure 15B:
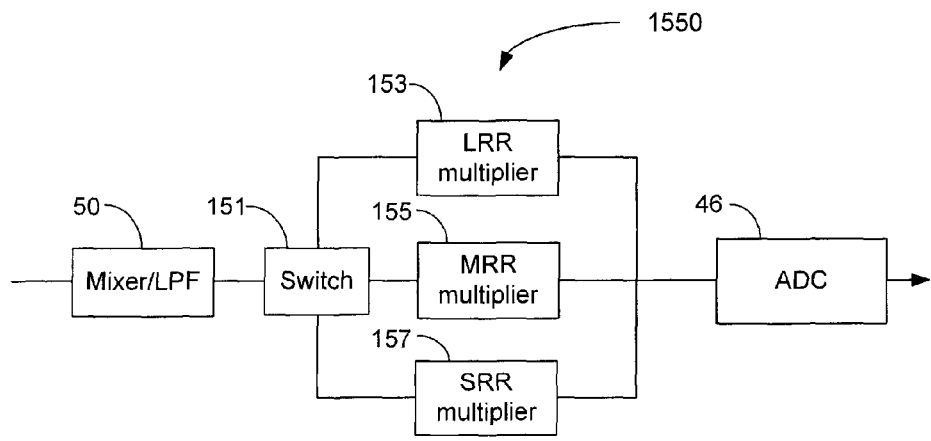
FIG. 15B shows a schematic of a frequency multiplier circuit for processing a reflected radar signal in a radar system operating in multiple modes.

Referring now to FIG. 15A and FIG. 15B, an alternate LFMCW signal 1500 is illustrated in accordance with an alternate embodiment. The LFMCW signal 1500 may be used as the input signal 31 to the transmitting assembly 10. In contrast to the frequency waveform 1400 seen in FIG. 14A and FIG. 14B, the LFMCW signal 1500 is operable to utilize consistent bandwidth chirping for the different modes (e.g. SRR, MRR, LRR) of the radar system 100. As illustrated in FIG. 15, each mode receives an up chirp and a down chirp of 2 ms. However, the linear frequency modulation of the bandwidth chirping is consistent across the different specific beam ports 60 α, β, γ.

When the reflected radar signal 6 is received by the receiving assembly 20, the outputted signal from the receiving assembly 20 is first passed through the filtering assembly 50 (FIG. 1) (i.e. with mixer 52 and LPF 54). As previously discussed, the mixer 52 compares the input signal, as transmitted by the transmitting assembly 10, with the outputted signal from the receiving assembly 20 to determine a distortion which is used by the signal processing unit 40 to determine target location, target velocity and target range. This combined signal may then be filtered. The filtered mixed signal may be passed to a frequency multiplier circuit 1550, such as seen in FIG. 15B, before being processed by the signal processing unit 40.

A frequency multiplier circuit 1550 may include separate frequency multipliers for each of the different modes in the radar system 100 (e.g. SRR, MRR and LRR). With this operating mode, the control unit 30 is operable to separate the outputted signal for each of the modes and multiply the frequency of the outputted signal by a selected factor to improve the returned signal prior to processing by the processing unit 40. A suitable switch 151 may furthermore be used to direct the signal from the filtering assembly 50 (i.e. with mixer 52 and LPF 54) to one of the LRR multiplier 153, the MRR multiplier 155 or the SRR multiplier 157. The signal may then be sent to the ADC 46 and on to the processing unit 40 for further processing.

In at least one embodiment the SRR multiplier 157 will not be required as the bandwidth chirping in the LFMCW signal 1500 will be sufficient for operating the radar system 100 in SRR mode. Instead, the returned signal may be fed directly into the ADC 46 from the switch 151.

The values of the LRR multiplier 153, the MRR multiplier 155 and the SRR multiplier 157 may be selected to ensure that the intermediate frequencies of all the reflected radar signals 6 can be sampled using the same ADC 46. For example, the values for the frequency multiplier circuit 1550 may be selected to transform the filter mixed signal corresponding to the LFMCW signal 1500 into a comparable outputted signal as would be created with the use of the frequency waveform 1400 seen in FIG. 14A.

Referring briefly back to FIG. 1, the components of the radar system 100 (e.g. signal generator 32, switching devices 36, transmitting assembly 10, and receiving assembly 20) have been designed to minimize their respective size requirements for packaging. As the Rotman lenses 12 and switching devices 36 for the generating/transmitting system 200 (FIG. 2A) and receiving/processing system 250 (FIG. 2B) are manufactured using MEMS technology, the footprint of these devices is small. Similarly, as most of the components may be manufactured using IC manufacturing processes, the various components may be placed within a single IC package.

Figure 16A:
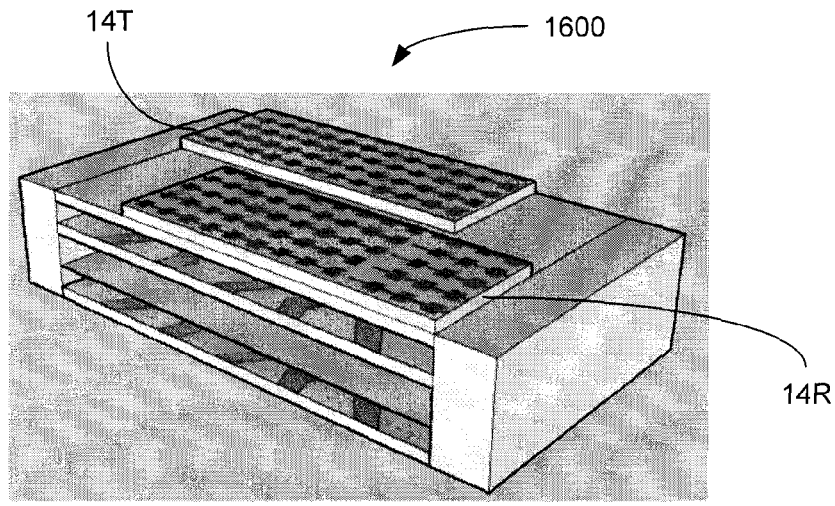
FIG. 16A shows an isometric view of a radar system housed in a layered package in accordance with an embodiment of the present invention.
Figure 16B:
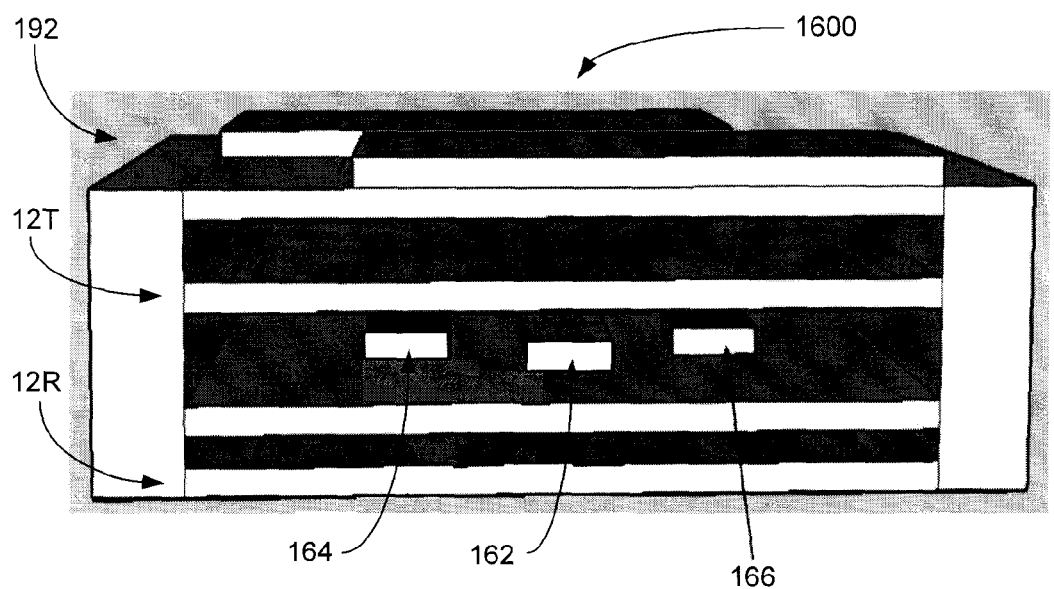
FIG. 16B shows an isometric view of the radar system housed in a layered package, as illustrated in FIG. 16A, from a different perspective showing major component placement.

Referring now to FIG. 16A and FIG. 16B, which illustrate schematically a four-level radar system package 1600 is illustrated in a single IC package (device package). It should be understood that greater or fewer number of layers may be used. The patch antenna assemblies 14 for both the transmitting assembly 10 and the receiving assembly 20 are located on the top-most layer 192. When installed, the two patch antenna assemblies 14T, 14R will be outward facing to transmit the incident radar signal 2 and receive the reflected radar signal 6 to and from the target vehicle 4.

The two Rotman lenses 12T, 12R for both the transmitting assembly 10 and the receiving assembly 20 may be placed separately on different layers (FIG. 16B). To isolate the Rotman lens 12T in the transmitting assembly 10 and the Rotman lens 12R in the receiving assembly 20, the layer housing the additional components of the radar system 100 may be sandwiched between the two Rotman lenses 12T, 12R. This may improve the RF performance of the radar system 100 by isolating the RF signals from each of the Rotman lenses 12. For example, the isolation between the transmitting assembly 10 and the receiving assembly 20 may be 40 dB or more.

Furthermore, additional layers may be used to house the other components of the radar system 100, such as the signal generator 32, the switching devices 36T, 36R, the control unit 30 and the signal processing unit 40, and the like. The different components may be integrated into a single ASIC or separated into different chip packages 162, 164, 166.

The radar system package 1600 may contain all of the components or the radar system 100. In such systems, the inputs to the radar system package 1600 may be limited to power and a number of control inputs and the outputs may be limited to the processed radar signals, such as necessary for driver notification 42 and/or required for sending over the CAN bus 44. The radar system package may then be installed in a selected host vehicle 8. The radar system package 1600 may be installed in the front and/or rear face of a vehicle. Furthermore, it may be installed on any part of the vehicle that is generally outward facing such that the top-most layer 192 is directed towards the FOV of interest. Optionally, one or more protective measures may be used to protect the radar system package from damage, such as from the weather and minor impacts. Such protective measures should not significantly interfere with the operation of the radar system 100 to inhibit operation.

In alternate embodiments, the control unit 30 and/or the signal processing unit 40 may be left off of the radar system package 1600 for external control and processing. This configuration may provide additional flexibility when integrated into a navigation system, a vehicle and other installations. Furthermore, if desired only selected parts of the control unit 30 and/or the signal processing unit 40 may be included in the radar system package 1600. For example, part of the signal processing unit 40 may be included in the radar system package 1600 to implement basic filtering and implement analog to digital conversion. The signal processing unit 40 may then output raw digital data for further digital signal processing, external to the radar system package 1600.

A radar system 100 packaged in the radar system package 1600 has been simulated to provide numerous benefits. The radar system package may be designed using to have a small form factor. For example, the radar system package 1600 illustrated in FIG. 16A and FIG. 16B may have dimensions of 30 mm×40 mm×10 mm, while demonstrating excellent isolation, low power requirements and high system stability in inclement weather. As the transmitting assembly 10 and receiving assembly 20 rely on passive Rotman lenses 12, there is no requirement for additional microelectronic signal processing for beam forming, as is required in prior art systems.

Furthermore, the radar system 100 is operable with a short update rate. For example, the update rate of the radar system 100 may be 6.8 ms or less. This compares favourably to prior art systems where the update rate may be 50 ms or more.

Finally, the radar system 100 may be fabricated using batch fabrication processes. As all or most of the components may be constructed using integrated circuit and MEMS technology in a single package, the manufacturing costs of the radar system package 1600 may be reduced.

Figure 17A:
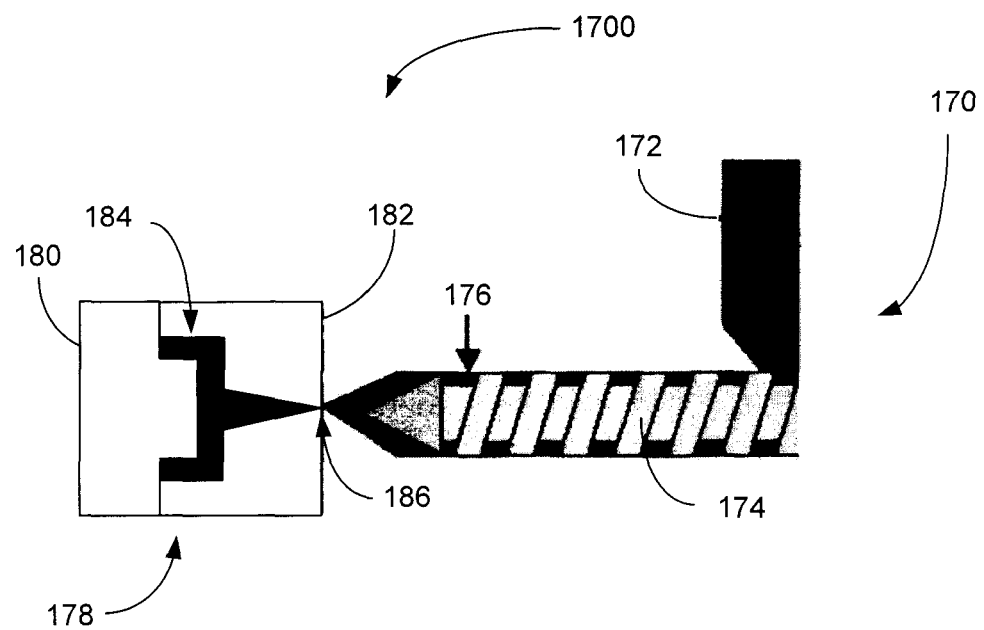
FIG. 17A shows forming a portion of a Rotman lens using a plastic injection molding process in accordance with a method of the present invention.
Figure 17B:
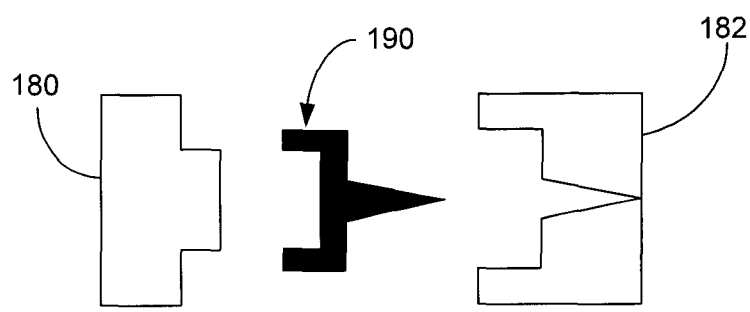
FIG. 17B shows forming a portion of a Rotman lens using a plastic injection molding process in accordance with a method of the present invention.

Another method of manufacturing a Rotman lens 12 is shown in FIG. 17A and FIG. 17B in an alternate embodiment using a micromolding process instead of using DRIE etch and thermocompression bonding. A micromolding process 1700 allows a suitable cavity of the lens 12 to be made out of different materials. While the substrate 68 used in the method described in FIG. 6 and depicted in FIG. 7A to FIG. 7D is typically selected out of materials common to wafer and integrated circuit design, a micromolding process may use polymers and the like. For example, a micromolding process may use a polymer 172 such as thermoplastics, thermosets and elastomers, and the like. As the Rotman lens 12 will eventually be coated with a conductor, such as a gold layer 72, there is no material requirement for the construction of the Rotman lens 12, itself.

Referring now to FIG. 17A, a micromold 178 is typically composed of two interlocking parts. The first part 180 and the second part 182 combine to form a cavity 184 in the micromold 178. Furthermore, one of the two interlocking parts 180, 182 has an opening 186 where the polymer 172 may be injected.

The basic process for micromolding a Rotman lens 12 by injection molding is shown in FIG. 17A using an injection molding machine 1700. Injection moulding machines 1700 usually have a clamping press to hold the tool. Clamp force is usually in the area of 2 to 3 tons per square inch of moulding area. The injection unit 170 is an auger type tapered screw 174 where the volume in the flights decreases as the resin or polymer 172 moves down to the tip of the screw. The screw barrel 176 is heated to a temperature above the melting point of the polymer 172 (usually from 450° to 650° F. depending on the resin) and as the polymer is screwed down the length of the screw barrel 176, the polymer is melted and mixed under pressure. At the tip of the screw barrel 176 is a one-way valve where the polymer 172 is pushed through the one-way valve to accumulate ahead of the screw 174 in the front of the screw barrel 176. The polymer 172 is kept in the screw barrel 176 by the one-way valve at the tip of the screw barrel 176. As the polymer 172 accumulates, the polymer 172 pushes the screw 174 back inside the screw barrel 176. When enough material has accumulated ahead of the screw 174, the tool is closed; the valve at the tip of the screw barrel 176 is opened; and the screw 174 is pushed forward pushing the accumulated molten polymer 172 trapped ahead of the screw by the one-way valve into the cavity 184 of the micromold 178. Injection pressures can be from 3,500 to 35,000 psi depending on the particular polymer 172 and the micromolding process used. The injection pressures are typically varied during the injection and freezing cycles of the micromolding process.

The micromold 178 is cooled by way of water filled cooling channels (not shown) running through the micromold 178 and when the polymer 172 has cooled sufficiently to freeze back to a solid, the micromold 178 is opened and the injection molded part 190 is removed by way of a mechanical ejection system. As shown in FIG. 17B, the bottom portion 700 of the Rotman lens 12 may be manufactured using an injection molding machine 1700. The top portion 702 may be similarly manufactured.

The high pressures and the low viscosity of the melted polymer 172 allow very precise and detailed shapes to be molded using a micromolding process. Furthermore, high reliability in forming a Rotman lens 12 is possible using a micromolding process.

Once the cavity of the Rotman lens 12 is formed, a 3 micrometer thick layer of gold is then sputter deposited or electroplated in both the bottom portion 700 and the top portion 702. Other forms of vacuum metalizing may also be used. The bottom portion 700 and the top portion 702 may be metalized in a similar fashion to the Rotman lens 12 described with respect to FIG. 7A and FIG. 7B. Finally the top portion 702 and the micromolded bottom portion 700 are bonded together. Thermopressure bonding may be used to bond the top portion to the bottom portion of the Rotman lens 12, as described with respect to FIG. 7C.

In an alternate embodiment, which is not expressly illustrated, a plurality of radar systems 100 may be installed on the host vehicle 8 as part of a navigation system. The plurality of radar systems 100 may have overlapping coverage to increase the FOV of the navigation system. For example, a plurality of radar systems 100 may be placed outwardly facing on the front of the car, such as on the front and the sides of the bumper assembly. Using multiple radar systems provides additional radar signals to detect additional target vehicles 4 in different FOV. Such a radar system 100 in a navigation system may operate at different frequencies or may incorporate multiplexing or other methods of isolating signals such that the radar systems operates to provide greater coverage than a single radar system 100 alone. A navigation system using different frequencies may have greater isolation and reduced interference between the plurality of radar signals being transmitted and received. For example, a plurality of radar systems may be layered upon each other to provide continuous, real-time hemispherical or spherical coverage or a 360° FOV. Alternate embodiments may provide an improved FOV over navigation system using a single radar system 100.

Figure 18:
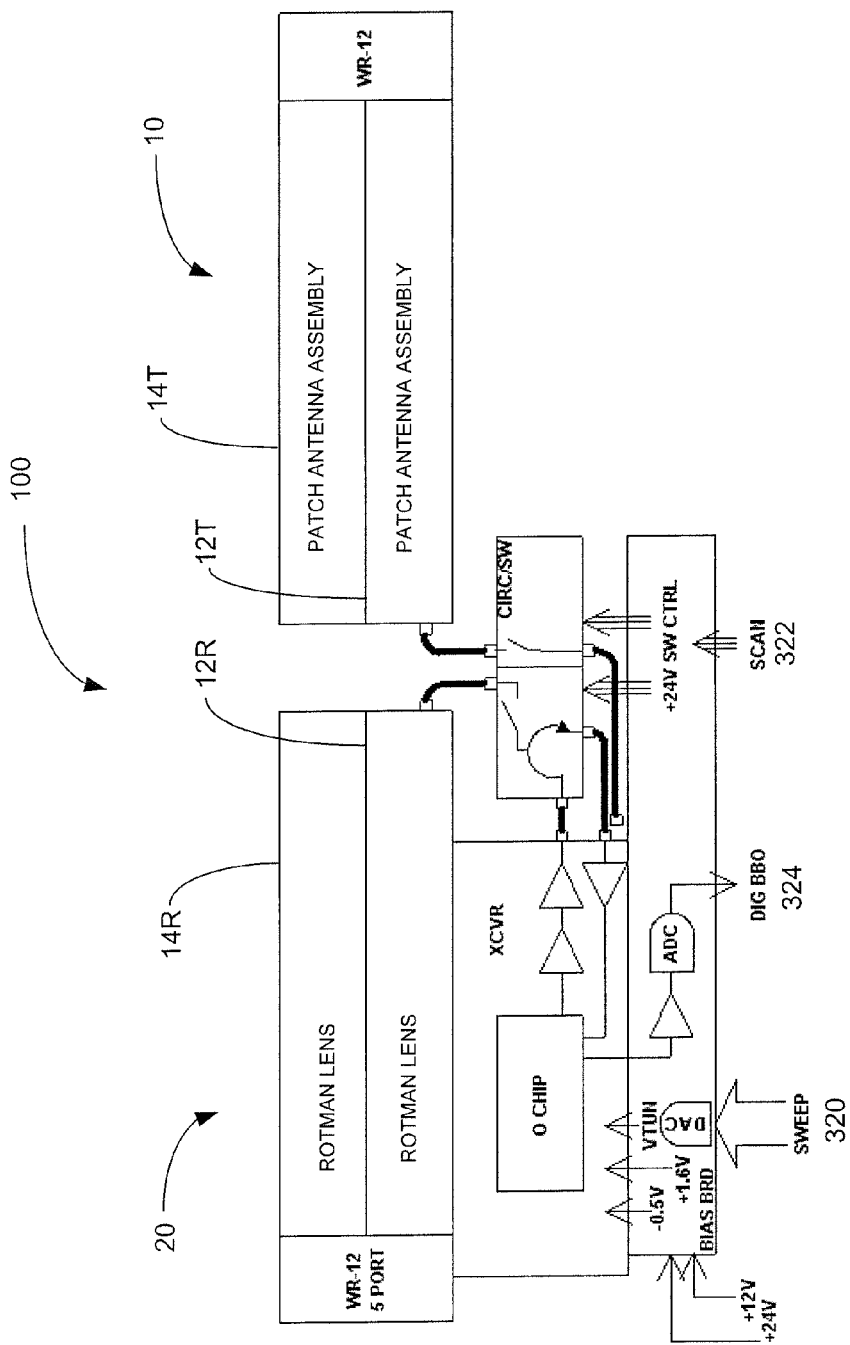
FIG. 18 shows an exemplary schematic diagram for a radar system having a transmitting and a receiving assembly in accordance with an alternate embodiment of the present invention.

Referring now to FIG. 18, a radar system 100 in accordance with a further embodiment is shown schematically, wherein like reference numbers are used to identify like components. The system 100 includes a radar system 100 a transmitting assembly 10 and a receiving assembly 20. The system may be implemented in the radar system package 1600 illustrated in FIG. 16A and FIG. 16B. Each of the transmitting assembly 10 and receiving assembly 20 incorporates, respectively, a Rotman lens 12T, 12R and patch antenna assembly 14T, 14R. In use, power signals may be provided to the radar system 100 (such as ±12V or ±24V) by either the host vehicle 8 (FIG. 12) or separately, by one or more batteries (not shown). Inputs to the radar system 100 may include a sweep signal input 320 and a scan signal input 322. Output signals may include a DIG BBO signal. It should be understood that other signals are possible.

FIG. 19 shows a radar system 100 in accordance with a further embodiment when like reference numbers are used to identify like components. In FIG. 19 a generic Rotman lens 12 is operable in both a transmitting and a receiving mode of operation. Similarly, a generic patch antenna assembly 14 is operable in both transmitting and receiving mode. Accordingly, the inventor has appreciated that the size and cost of the radar system 100 may be further reduced by utilizing a single Rotman lens 12 and a single patch antenna assembly 14 for both the transmitting and receiving of a radar signal.

In FIG. 19, a Rotman lens 12 and a patch antenna assembly 14 operate as part of a single transmitting/receiving assembly 328. It is to be appreciated that the transmitting/receiving assembly 328 further includes input and output waveguides 330, 332 and suitable microwave interconnect devices 86 (FIG. 4), to connect the Rotman lens 12 to the patch antenna assembly 14. To isolate the transmitted signals from the received signals and to ensure the proper direction of the signals, a circulator 350 is provided as part of a circulator/switch assembly together with switching device 36.

The switching device 36 acts as the transmitting switching device when connecting the input signal 31 (FIG. 1) to the transmitting/receiving assembly 328, and as the receiving switching device when directing the reflected radar signal 6 (FIG. 1) to the device signal processing unit. A transceiver 334 and an ASIC 336 are provided for implementing control and signal processing operations (such as forming the control unit 30 and the signal processing unit 40).

Although this disclosure has described and illustrated certain preferred embodiments of the invention, it is also to be understood that the invention is not restricted to these particular embodiments rather, the invention includes all embodiments which are functional, or mechanical equivalents of the specific embodiments and features that have been described and illustrated herein. For a definition of the invention, reference may be made to the appended claims.

It will be understood that, although various features of the invention have been described with respect to one or another of the embodiments of the invention, the various features and embodiments of the invention may be combined or used in conjunction with other features and embodiments of the invention as described and illustrated herein. Furthermore, while methods have been described as a series of steps in a particular order, it should be understood that the steps may be taken in different orders as known to a person skilled in the art. Any order described should not be construed as limiting.

We claim:

1. A radar system comprising:
   a transmitting assembly for receiving an input signal and for transmitting an incident radar signal, the transmitting assembly comprising:
      a Rotman lens comprising:
         a lens cavity defined by a bottom wall, a top wall and a sidewall, wherein the bottom wall is separated by the top wall to form a lens gap between 10 microns to 120 microns,
         a plurality of beam ports in communication with the lens cavity and being spaced towards a first end, wherein each beam port operable to effect the propagation of an electromagnetic wave having a frequency at a selected wavelength ($\lambda$) into the lens cavity, and a plurality of array ports in communication with the lens cavity and spaced towards a second end of the lens cavity opposite the first end, wherein the spacing of the plurality of array ports is configured to effect a phase shift of the electromagnetic wave from each of the beam ports to all of the array ports, and wherein the plurality of array ports output a plurality of time-delayed, in-phase signals based on the electromagnetic wave entering the lens cavity from one of the plurality of beam ports; and a patch antenna assembly comprising a plurality of antenna arrays, wherein each antenna array is in communication with one of the array ports, and wherein the plurality of antenna arrays is operable to receive the plurality of time-delayed, in-phase signals from the Rotman lens and to transmit incident radar signals in a selected direction towards a target;

a receiving assembly for receiving a reflected radar signal from the target and for producing an output signal;

a control unit for operating the radar system; and a signal processing unit for comparing the input signal sent to the transmitting assembly and the output signal produced from the receiving assembly.

2. The radar system of claim 1, wherein the radar system is enclosed within a device package having a package width of about 11 mm, a package length of about 14 to 14.5 mm and a package height of about 1 mm.

3. The radar system of claim 1, wherein the lens gap is filled with air or a dielectric material.

4. The radar system of claim 1, wherein the lens gap of the lens cavity is selected less than half of the selected wavelength ($\lambda/2$) of the electromagnetic wave.

5. The radar system of claim 4, wherein the frequency of the electromagnetic wave is between 15 GHz and 100 GHz, and preferably between 70 GHz and 80 GHz.

6. The radar system of claim 1, wherein the lens cavity is coated with a conductive material having a reflective surface.

7. The radar system of claim 6, wherein the conductive material is selected from the group consisting of gold, platinum, silver, copper and chrome.

8. The radar system of claim 6, wherein the conductive material is deposited on the lens cavity using a process selected from the group consisting of vacuum metalizing sputtering, and electroplating.

9. The radar system of claim 1, wherein the lens cavity has a central axis between the two ends of the lens cavity, and wherein the plurality of beam ports and the plurality of array ports are symmetric about the central axis.

10. The radar system of claim 9, wherein the Rotman lens has three beam ports and five array ports.

11. The radar system of claim 1, wherein the signal processing unit compares the input signal to the output signal to determine a distortion between the input signal and the output signal.

12. The radar system of claim 11, wherein the plurality of time-delayed, in-phase signals are electromagnetic signals and the patch antenna assembly is operable to receive electrical signals, the system further including at least one microwave interconnect device, wherein the plurality of time-delayed, in-phase signals are converted to said electrical signals by the at least one microwave interconnect device.

13. The radar system of claim 1 further comprising:

a signal generator for generating the input signal, wherein the input signal comprises a Linear Frequency Modulated Continuous Wave (LFMCW) signal, and wherein the signal generator communicates the input signal to the transmitting assembly.

14. The radar system of claim 13, wherein the LFMCW signal comprises a repeating pattern of bandwidth chirping having a plurality of non-identical pairs of up chirps and down chirps, wherein the radar system operates in multiple radar range modes, wherein each specific pair of up chirps and down chirps is associated with a specific radar range mode, and wherein each specific pair of up chirps and down chirps is transmitted by the transmitting assembly when the radar system is operating in the specific radar range mode.

15. The radar system of claim 1, wherein the receiving assembly comprises:

a second Rotman lens, and a second patch antenna assembly comprising a second plurality of antenna arrays, wherein the second patch antenna assembly is operable to receive the reflected radar signal as a second plurality of time-delayed, in-phase signals and communicate the second plurality of time-delayed, in-phase signals to the second Rotman lens, and wherein the second Rotman lens is operable to receive the second plurality of time-delayed, in-phase signals and communicate the output signal to the signal processing unit, wherein the output signal is a second electromagnetic wave based on the second plurality of time-delayed, in-phase signals received by the second Rotman lens.

16. The radar system of claim 1, wherein each of the plurality of antenna arrays comprises a plurality of microstrip patches connected in series, wherein each microstrip patch comprises a strip of a conductor separated from a ground plane by a substrate, and wherein the selected direction of the incident radar signal corresponds to a combination of the number of microstrip patches in each of the plurality of antenna arrays and the beam port receiving the electromagnetic wave.

17. The radar system of claim 16, wherein the control unit comprises a switching device, wherein the switching device is operable to select which beam port receives the input signal, and wherein the input signal is converted to an electromagnetic wave by a microwave interconnect device.

18. The radar system of claim 17, wherein the control unit is operable to cycle the input signal through the plurality of beam ports, wherein the plurality of microstrip patches connected in series for each of the plurality of antenna arrays is a fixed number.

19. The radar system of claim 17, wherein each of the plurality of antenna arrays is segmented into at least two microstrip segments, each microstrip segment comprising at least one microstrip patch in the plurality of microstrip patches connected in series;

wherein the transmitting assembly further comprises:
an RF switch array comprising a plurality of RF switches,
wherein each RF switch is coupled between two microstrip segments, wherein, when enabled, each RF switch is operable to connect the two microstrip segments and when disabled, each RF switch is operable to disconnect the two microstrip segments to reduce the operable number of microstrip patches in each of the plurality of antenna arrays.

20. The radar system of claim 19, wherein the radar system is operable to detect objects at least two distance ranges,
wherein, when each of the RF switches in the first RF switch array is disabled, the radar system is operable to detect the target at a first distance range, and
wherein, when each of the RF switches in the first RF switch array is enabled, the radar system is operable to detect the target at a second distance range farther than the first distance range.

21. The radar system of claim 20, wherein the control unit is operable to cycle the input signal through different combinations of the plurality of beam ports and the at least two distance ranges.

22. A radar system comprising:
a transmitting assembly for receiving an input signal and for transmitting an incident radar signal, the transmitting assembly comprising:
a Rotman lens comprising:
a lens cavity defined by a bottom wall, a top wall and a sidewall, wherein the bottom wall is separated by the top wall to form a lens gap between about 10 microns to about 120 microns,
a plurality of beam ports in communication with the lens cavity and being spaced towards a first end, wherein each beam port operable to effect the propagation of an electromagnetic wave having a frequency at a selected wavelength ($\lambda$) into the lens cavity, and
a plurality of array ports in communication with the lens cavity and spaced towards a second end of the lens cavity opposite the first end, wherein the spacing of the plurality of array ports is configured to effect a phase shift of the electromagnetic wave from each of the beam ports to all of the array ports, whereby the plurality of array ports output a plurality of time-delayed, in-phase signals based on the electromagnetic wave entering the lens cavity from one of the plurality of beam ports; and
an antenna assembly comprising at least one antenna arrays in communication with one of the array ports, and wherein said at least one antenna array is operable to receive the plurality of time-delayed, in-phase signals from the Rotman lens and to transmit incident radar signal in a selected direction towards a target.

23. The radar system of claim 22 further including,
a receiving assembly for receiving a reflected radar signal from the target and for producing an output signal; and
a signal processing assembly for comparing the input signal and the output signal.

24. The radar system of claim 22, wherein the lens gap of the lens cavity is selected less than half of the selected wavelength ($\lambda/2$) of the electromagnetic wave.

25. The radar system of claim 22, wherein the lens gap is filled with air or a dielectric material.

26. The radar system of claim 22, wherein the frequency of the electromagnetic wave is selected at between about 70 GHz and about 80 GHz.

27. The radar system of claim 22, wherein the lens cavity is coated with a conductive material selected from the group consisting of gold, platinum, silver, copper and chrome.

28. The radar system of claim 22, wherein the Rotman lens has at least three beam ports and at least five array ports.

29. The radar system of claim 22 further comprising:
a signal generator for generating the input signal, wherein the input signal comprises a Linear Frequency Modulated Continuous Wave (LFMCW) signal, and wherein the signal generator communicates the input signal to the transmitting assembly,
the LFMCW signal comprising a repeating pattern of bandwidth chirping having a plurality of non-identical pairs of up chirps and down chirps,
wherein the radar system operates in multiple radar range modes,
wherein each specific pair of up chirps and down chirps is associated with a specific radar range mode, and
wherein each specific pair of up chirps and down chirps is transmitted by the transmitting assembly when the radar system is operating in the specific radar range mode.

* * * * *